(12) United States Patent
Morishita et al.

(10) Patent No.: US 9,266,559 B2
(45) Date of Patent: Feb. 23, 2016

(54) ELECTRIC POWER STEERING DEVICE

(75) Inventors: Fumihiro Morishita, Tochigi-ken (JP);
Kyoji Hamamoto, Tochigi-ken (JP);
Hiroaki Horii, Tochigi-ken (JP); Takuji Wada, Tochigi-ken (JP); Hiroki Sagami, Tochigi-ken (JP); Shinji Hironaka, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 30 days.

(21) Appl. No.: 13/977,982

(22) PCT Filed: Jan. 5, 2012

(86) PCT No.: PCT/JP2012/050045
§ 371 (c)(1),
(2), (4) Date: Jul. 2, 2013

(87) PCT Pub. No.: WO2012/093679
PCT Pub. Date: Jul. 12, 2012

(65) Prior Publication Data
US 2013/0304327 A1 Nov. 14, 2013

(30) Foreign Application Priority Data

Jan. 7, 2011 (JP) .................. 2011-002563
Jan. 7, 2011 (JP) .................. 2011-002564
Jan. 7, 2011 (JP) .................. 2011-002565

(51) Int. Cl.
*A01B 69/00* (2006.01)
*B62D 5/04* (2006.01)

(52) U.S. Cl.
CPC .............. *B62D 5/0484* (2013.01); *B62D 5/049* (2013.01); *B62D 5/0463* (2013.01)

(58) Field of Classification Search
CPC ... B60W 10/02; B62D 5/0484; B62D 5/0463; B62D 5/049

USPC ............................................ 701/43; 180/446
See application file for complete search history.

(56) References Cited

U.S. PATENT DOCUMENTS 6,496,762 B2 * 12/2002 Kurishige ............ B62D 5/0466
180/446
7,574,294 B2 * 8/2009 Ta ......................... B62D 5/046
180/234

(Continued)

FOREIGN PATENT DOCUMENTS

JP      6-096389 B2    11/1994
JP      2830992 B2    12/1998

(Continued)

OTHER PUBLICATIONS

Office Action and Search Report dated Aug. 17, 2015 issued over the corresponding Chinese Patent Application No. 201280004702.6 with English translation of pertinent portion.

*Primary Examiner* — Behrang Badii
*Assistant Examiner* — Daniel L Greene
(74) *Attorney, Agent, or Firm* — Carrier Blackman & Associates, P.C.; Joseph P. Carrier; William D. Blackman

(57) ABSTRACT

An electric power steering device provides an appropriate power assist from the motor even when torque sensors have failed and the steering torque is no longer detected. If an error is detected in a torque sensor, the motor is driven based on the rotor rotation angle detected by a resolver and assist characteristics. When the absolute value of the rotor turning angle velocity calculated based on the rotor rotation angle falls to or below a prescribed value, a process is started for reducing the current driving the motor, and if the state in which the absolute value of the rotor turning angle velocity has fallen to or below the prescribed value continues over a prescribed length of time, the process for reducing the current is interrupted and, because an assist current was flowing at said time of interruption, an appropriate power assist can be given during a steering retention period.

8 Claims, 16 Drawing Sheets

(56) References Cited

U.S. PATENT DOCUMENTS

| | | | |
|---|---|---|---|
| 7,841,443 B2* | 11/2010 | Mizuno et al. | 180/444 |
| 8,960,363 B2* | 2/2015 | Morishita | B62D 5/0463 180/446 |
| 2002/0033300 A1* | 3/2002 | Takeuchi et al. | 180/446 |
| 2003/0079932 A1* | 5/2003 | Ono et al. | 180/407 |
| 2006/0042404 A1 | 3/2006 | Shimizu et al. | |
| 2008/0047775 A1* | 2/2008 | Yamazaki | 180/443 |
| 2009/0240389 A1* | 9/2009 | Nomura et al. | 701/29 |

FOREIGN PATENT DOCUMENTS

| | | |
|---|---|---|
| JP | 3055752 B2 | 6/2000 |
| JP | 2001-253356 A | 9/2001 |
| JP | 2004-009857 A | 1/2004 |
| JP | 2004-114755 A | 4/2004 |
| JP | 2004-338562 A | 12/2004 |
| JP | 2006-064445 A | 3/2006 |
| JP | 4057552 B2 | 3/2008 |
| JP | 2008-132836 A | 6/2008 |
| JP | 2010-274842 A | 12/2010 |

\* cited by examiner

ELECTRIC POWER STEERING DEVICE

TECHNICAL FIELD

The present invention relates to an electric power steering apparatus (electric power steering device) for turning a vehicle with a light steering force applied to a steering wheel by an operator when the steering force applied to the steering wheel is transmitted through a steering system to road wheels.

BACKGROUND ART

Steering forces applied to a steering wheel by the operator are detected by a torque sensor that is mounted on a steering shaft coupled to the steering wheel. Based on the steering forces (steering torque) detected by the torque sensor, a controller of an electric power steering apparatus energizes an electric motor (hereinafter simply referred to as "motor"), which generates an assistive torque. The electric power steering apparatus transmits the generated assistive torque through a worm gear speed reducer mechanism, etc. to the steering shaft (steering system) for thereby reducing the steering forces that are applied to the steering wheel by the operator.

One known form of the torque sensor, as disclosed in Japanese Patent No. 3055752 (JP3055752B2) and Japanese Patent No. 2830992 (JP2830992B2), includes a torsion bar interconnecting an input shaft and an output shaft, and a core engaging the input shaft and the output shaft. When a torque is applied between the input and output shafts, the core is displaced, and the displacement of the core is electrically detected by a detecting coil. Another known torque sensor, as disclosed in Japanese Patent No. 3964414 (JP3964414B2) and Japanese Patent No. 4057552 (JP4057552B2), includes magnetostrictive films disposed on a steering shaft, and detecting coils for detecting a change in the magnetic characteristics of the magnetostrictive films. A torque applied to the steering shaft is electrically detected by the detecting coils.

Japanese Patent Publication No. 06-096389 (JPH06-096389B2) discloses a technology which, in the event of a failure of a torque sensor, cancels assisting of a steering force by the motor and makes a steering system manually operable when the vehicle speed is equal to or higher than a prescribed speed, and controls the motor depending on a steering angular velocity calculated from an output signal from a steering angle sensor when the vehicle speed is equal to or lower than the prescribed speed.

SUMMARY OF INVENTION

Heretofore, when the torque sensor for detecting a steering torque fails, the electric motor (hereinafter simply referred to as "motor") is controlled depending on a steering angular velocity calculated from an output signal from the steering angle sensor, as disclosed in JPH06-096389B2.

However, on vehicles that do not incorporate a steering angle sensor, if the torque sensor fails and hence is unable to detect steering torques, then the assistance to a steering force by the electric motor is forced to be canceled.

The present invention has been made in view of the above problems. It is an object of the present invention to provide an electric power steering apparatus which is capable of applying an appropriate steering assistive force generated by a motor even if a torque sensor fails and is unable to detect a steering torque.

According to the present invention, there is provided an electric power steering apparatus comprising an operating member which is operated by the driver to steer a vehicle, a torque detector for detecting a torque generated by a steering system of the vehicle, a vehicle speed detector for detecting a vehicle speed of the vehicle, a motor for applying an assistive torque to a rotational shaft of the steering system, a rotational angle detector for detecting a rotational angle of the steering system, and a motor controller for controlling an electric current for energizing the motor based on the torque detected by the torque detector, wherein the electric power steering apparatus also includes an abnormality detector for detecting whether the torque detector becomes abnormal or not, and a storage unit storing, as a characteristic, the relationship between the rotational angle detected by the rotational angle detector and the electric current for energizing the motor.

When the abnormality detector detects an abnormality of the torque detector, the motor controller energizes the motor based on the rotational angle detected by the rotational angle detector and the characteristic, and when the motor is energized, the motor controller starts a process of reducing an electric current for energizing the motor if the absolute value of a rotational angular velocity calculated based on the rotational angle is equal to or smaller than a prescribed value, and interrupts the process of reducing the electric current for energizing the motor if the absolute value of the rotational angular velocity continues to be equal to or smaller than the prescribed value for a prescribed time.

According to the present invention, when the abnormality detector detects an abnormality of the torque detector, the motor controller energizes the motor based on the characteristics of the electric current for energizing the motor with respect to the rotational angle detected by the rotational angle detector, and when the motor is energized, the motor controller starts a process of reducing the electric current for energizing the motor if the absolute value of a rotational angular velocity calculated based on the rotational angle is equal to or smaller than a prescribed value, and interrupts the process of reducing the electric current for energizing the motor if the absolute value of the rotational angular velocity continues to be equal to or smaller than the prescribed value for a prescribed time. Accordingly, an appropriate assistive force can be applied to the operating member in a steering-maintaining mode.

In this case, after the motor controller has interrupted the process of reducing the electric current for energizing the motor, the motor controller may resume the process of reducing the electric current for energizing the motor if the absolute value of the rotational angle at the time the process of reducing the electric current is interrupted decreases by a prescribed angle or greater. Therefore, when the steering-maintaining mode is no longer required, the assistive force is reduced.

According to the present invention, when the abnormality detector detects an abnormality of the torque detector, the motor controller energizes the motor based on the characteristics of the electric current for energizing the motor with respect to the rotational angle detected by the rotational angle detector. Therefore, for example, even if the torque sensor fails and is unable to detect the steering torque, a steering assistive force can be applied to the operating member. When the motor is energized, the motor controller starts the process of reducing the electric current for energizing the motor if the absolute value of the rotational angular velocity calculated based on the rotational angle is equal to or smaller than the prescribed value, and interrupts the process of reducing the electric current for energizing the motor if the absolute value of the rotational angular velocity continues to be equal to or smaller than the prescribed value for the prescribed time.

Accordingly, an appropriate assistive force can be applied to the operating member in the steering-maintaining mode.

When the abnormality detector detects an abnormality of the torque detector, the motor controller energizes the motor based on the rotational angle detected by the rotational angle detector and the characteristic, and when the motor is energized, the motor controller reduces the electric current for energizing the motor as a rotational angular velocity calculated based on the rotational angle increases.

According to the present invention, when the abnormality detector detects an abnormality of the torque detector, the motor controller energizes the motor based on the rotational angle detected by the rotational angle detector and the characteristic curve, and when the motor is energized, the motor controller reduces the electric current for energizing the motor as a rotational angular velocity calculated based on the rotational angle increases. Consequently, when the torque detector becomes abnormal, the operating member is prevented from being turned excessively, and an appropriate assistive force is applied to the operating member.

In this case, the motor controller may correct the rotational angular velocity detected by the rotational angle detector so as to be smaller as the vehicle speed becomes smaller than a prescribed vehicle speed, and energize the motor based on the corrected rotational angular velocity and the characteristic.

According to the present invention, the motor controller energizes the motor with the rotational angular velocity that is corrected such that the rotational angular velocity, as an argument of the electric current for energizing the motor, decreases as the vehicle speed becomes smaller than the prescribed vehicle speed. Accordingly, an assistive force to be applied to the operating member is maintained at the time when the vehicle is running at the prescribed vehicle speed or lower during which time a more steering force is required.

According to the present invention, even when the torque detector fails and is unable to detect the steering torque, a steering assistive force generated by the motor may be applied to the operating member both in cases where it is turned and returned, based on the rotational angle detected by the rotational angle detector. Especially when the operating member is turned, the assistive force is controlled so as to decrease as the rotational angular velocity increases. Therefore, the operating member is prevented from being turned excessively, and an appropriate assistive force is applied to the operating member.

When the abnormality detector detects an abnormality of the torque detector, the motor controller detects a returning rotational angle using, as a reference angle, the rotational angle detected by the rotational angle detector when a turning assistive electric current becomes nearly zero while a returning angle remains at the time the operating member is returned during which the steering angle (also called an operating angle) of the operating member changes toward a neutral position thereof, and energizes the motor based on the returning rotational angle and the characteristic.

According to the present invention, the motor controller detects a returning rotational angle using, as a reference angle, the rotational angle detected by the rotational angle detector when a turning assistive electric current becomes nearly zero while a returning angle remains, and energizes the motor based on the returning rotational angle and the characteristic curve. Therefore, the driver can be assisted in making the operating angle of the operating member closer to the neutral position. The steering force applied by the driver to the operating member to return the operating member can be reduced, thereby making it easy for the driver to return the operating member to the neutral position.

In this case, when the operating member is returned, the energization of the motor may be allowed if the vehicle speed is equal to or lower than a prescribed vehicle speed.

According to the present invention, in view of the fact that the SAT (Self Aligning Torque) is weak when the driver returns the operating member if the vehicle speed is equal to or lower than the prescribed speed and a returning angle remains, an assistive force is applied even when the SAT is weak. Therefore, the steering force applied by the driver to return the operating member can be reduced.

Preferably, the electric current for energizing the motor at the time the operating member is returned is multiplied by a prescribed coefficient depending on the steerability of the vehicle.

More specifically, since the steerability of the vehicle varies with the load imposed on each vehicle (the front axle weight of the vehicle), it is possible to provide optimum steering assistance depending on the steerability of the vehicle by multiplying the electric current for energizing the motor by a coefficient depending on the steerability of the vehicle.

The electric current for energizing the motor may be reduced as the steering angle of the operating member which corresponds to the returning angle approaches the neutral position. As a result, the assistive electric current becomes substantially zero at the neutral position, so that the driver is prevented from being excessively assisted.

When the operating member is returned, the returning rotational angle may be reset if the steering angle of the operating member reaches the neutral position. The driver is thus appropriately assisted in subsequently turning the operating member.

According to the present invention, when the abnormality detector detects an abnormality of the torque detector, the motor controller energizes the motor based on the characteristics of the electric current for energizing the motor with respect to the rotational angle detected by the rotational angle detector. Therefore, for example, even if the torque sensor fails and is unable to detect the steering torque, a steering assistive force can be applied to the operating member. The motor controller detects a returning rotational angle using, as a reference angle, the rotational angle detected by the rotational angle detector when a turning assistive electric current becomes nearly zero while a returning angle remains, and energizes the motor based on the returning rotational angle and the characteristic curve. Therefore, the driver can be assisted in making the operating angle of the operating member closer to the neutral position. The steering force applied by the driver to the operating member to return the operating member can be reduced, thereby making it easy for the driver to return the operating member to the neutral position.

DESCRIPTION OF EMBODIMENTS

An embodiment of the present invention will be described below with reference to the drawings.

Figure 1:
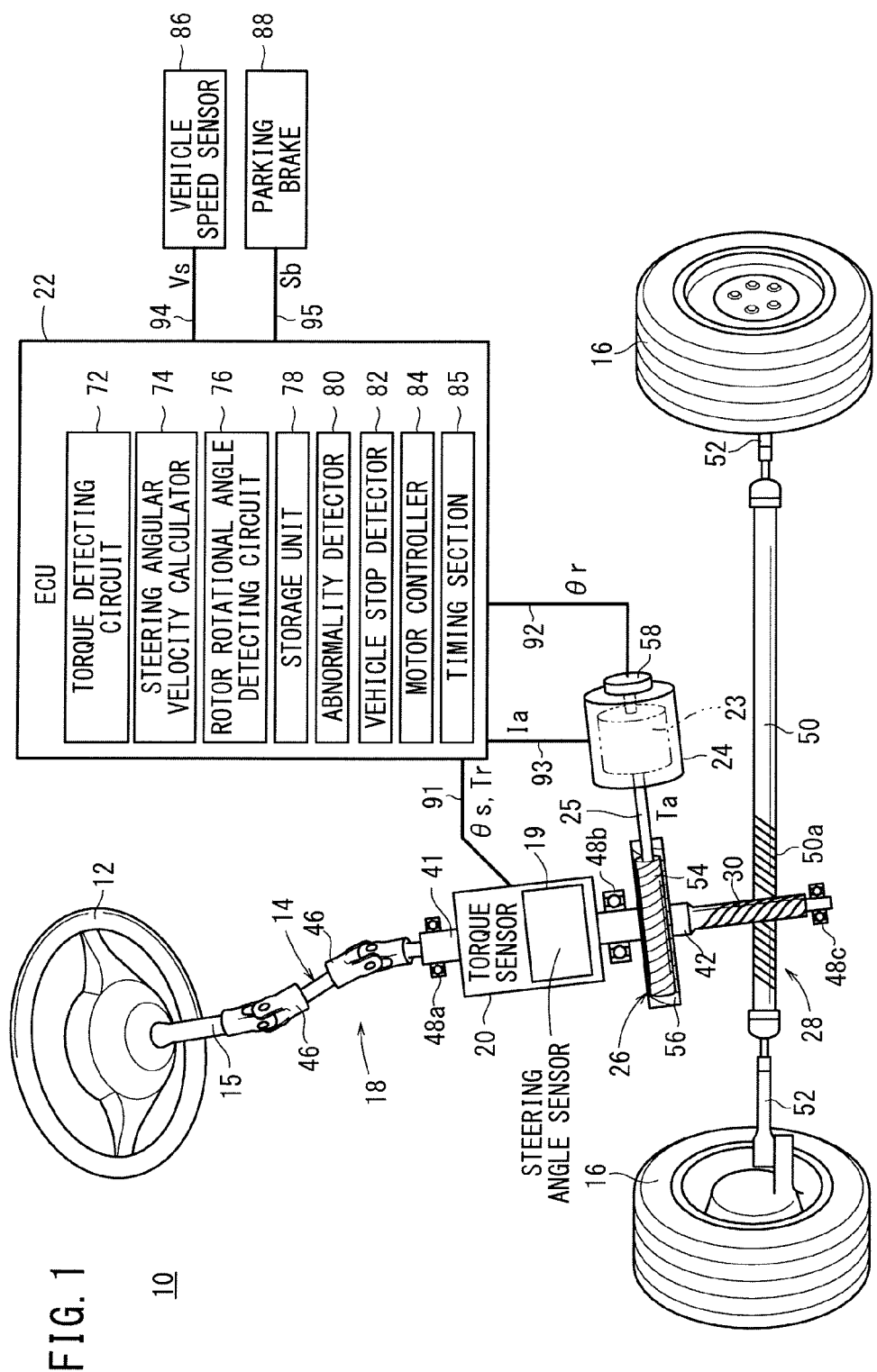
FIG. 1 is a schematic view of an electric power steering apparatus according to an embodiment, and first through third inventive examples of the present invention.

FIG. 1 is a schematic view of an electric power steering apparatus 10 in its entirety according to the embodiment of the present invention, which is incorporated in a vehicle.

Figure 2:
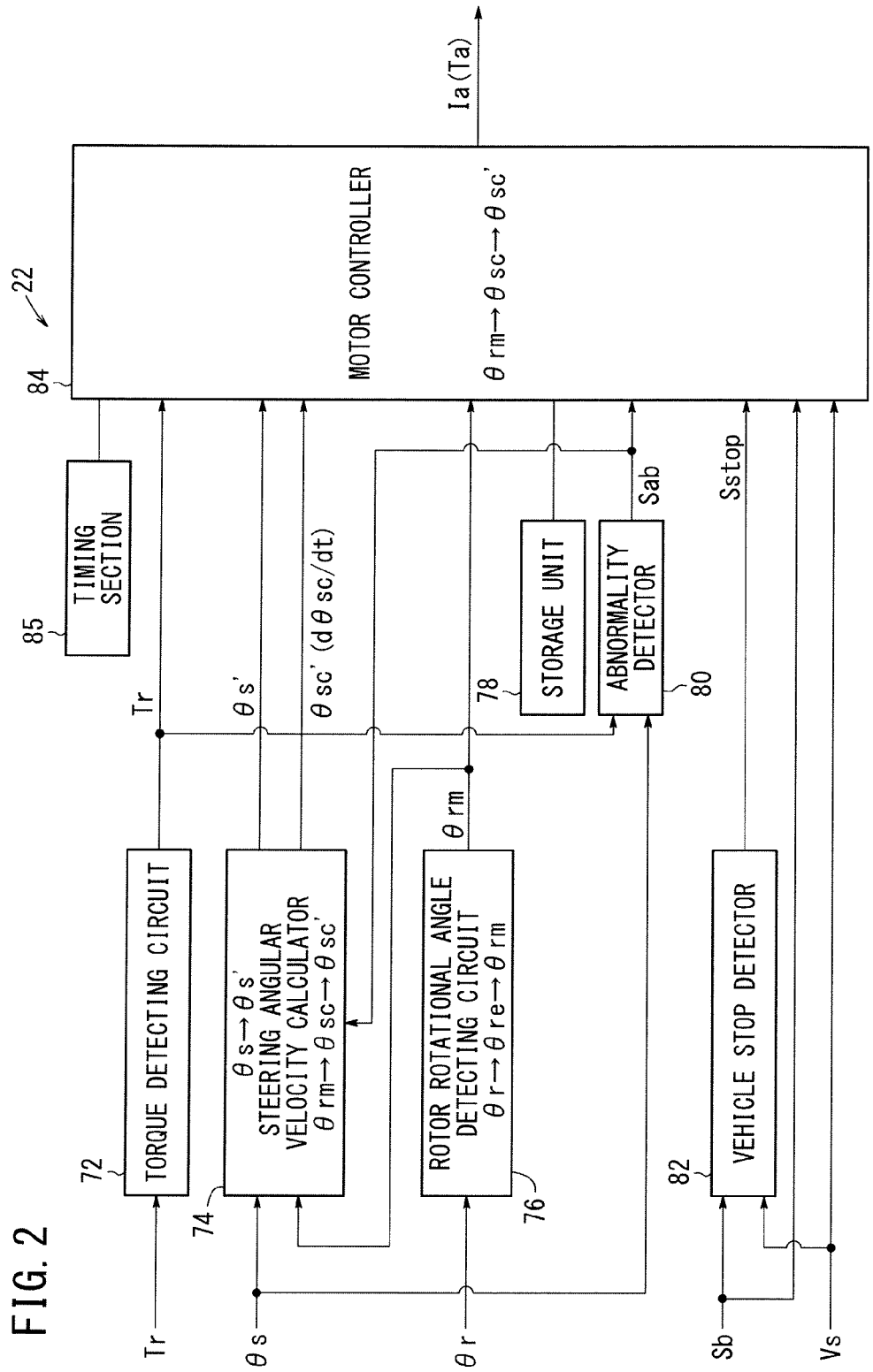
FIG. 2 is a diagram showing connections in an ECU of the electric power steering apparatus shown in FIG. 1.

FIG. 2 is a functional block diagram of an ECU (Electric Control Unit) 22 of the electric power steering apparatus 10 shown in FIG. 1.

As shown in FIG. 1, the electric power steering apparatus 10 basically includes a steering system 18 ranging from a steering wheel 12 (operating member to be operated by a driver to maneuver the vehicle) through a steering shaft 14 to steerable road wheels 16, a torque sensor (also referred to as "torque sensor and steering angle sensor") 20 disposed on a rotational shaft of the steering system 18 and including a steering angle sensor 19 therein, for detecting a torque Tr and a steering angle θs of the rotational shaft, an ECU 22 for determining an assistive torque Ta based on output signals from the torque sensor 20 or the like, an electric motor (hereinafter simply referred to as "motor") 24, which is a brushless motor energizable by the ECU 22, and a speed-reducer transmitting mechanism 26 for transmitting output power of the motor 24 at a speed reduction ratio as the assistive torque Ta to the rotational shaft of the steering system 18. The motor 24 may be a brushed motor.

The torque sensor 20 is of a known structure wherein an input shaft 41 and an output shaft 42, which serve as the rotational shafts of the steering system 18, are connected to each other by a torsion bar, and two detecting coils (not shown) are supported on a housing (not shown) and disposed around a hollow cylindrical core (not shown) held in engagement with the input and output shafts 41, 42 (see, for example, JP3055752B2 and JP2830992B2).

The steering angle sensor 19 has a known structure for detecting a rotational angle of the input shaft 41 as the steering angle θs (see, for example, JP3055752B2).

The torque sensor 20 may be of another known structure comprising a magnetostrictive film sensor with no torsion bar and no hollow cylindrical core (see, for example, JP3964414B2 or JP4057552B2).

Even where a torque sensor is free of the steering angle sensor 19, the present invention is also applicable to a case where a steering angle sensor is separately provided for detecting a rotational angle of the steering system 18, e.g., to a vehicle which performs a lateral anti-skid control process at the time the vehicle makes a turn, by use of the separately-provided steering angle sensor.

The torque Tr and the steering angle θs represented by the output signals from the torque sensor 20 and the steering angle sensor 19 are supplied through a harness 91 respectively to a torque detecting circuit 72 of the ECU 22 and a steering angular velocity calculator 74 of the ECU 22.

The steering shaft 14 comprises a joined assembly of rotational shafts including a main steering shaft 15 integrally coupled to the steering wheel 12, the input shaft 41 coupled to the main steering shaft 15 by a universal joint 46, and the output shaft 42 having a pinion 30 of a rack-and-pinion mechanism 28.

The input shaft 41 and the output shaft 42 are supported by respective bearings 48a, 48b, 48c with the pinion 30 being combined with a lower end portion of the output shaft 42. The pinion 30 is held in mesh with rack teeth 50a on a rack shaft 50 that is reciprocally movable in the transverse directions of the vehicle. The steerable road wheels 16, which are left and right front road wheels of the vehicle, are coupled respectively to the opposite ends of the rack shaft 50 by tie rods 52.

The steering system 18 includes the steering wheel 12, the steering shaft 14 (the main steering shaft 15, the universal joint 46, the input shaft 41, and the output shaft 42 with the pinion 30), the rack shaft 50 with the rack teeth 50a, the tie rods 52, and the steerable road wheels 16.

The steering system 18 of the above structure makes it possible to perform a normal rack-and-pinion steering process when the steering wheel 12 is turned. The driver of the vehicle can thus change the direction of the vehicle by turning the steering wheel 12 to steer the steerable road wheels 16. The rack shaft 50, the rack teeth 50a, and the tie rods 52 jointly make up a steering mechanism in the steering system 18.

As described above, the electric power steering apparatus 10 includes the motor 24 for supplying a steering assistive force (also simply referred to as "assistive force") for reducing the steering force applied to the steering wheel 12. A worm gear 54 that is fixed to a rotational shaft 25 of the motor 24 is held in mesh with a worm wheel gear 56 mounted below the bearing 48b positioned on an intermediate portion of the output shaft 42. The worm gear 54 and the worm wheel gear 56 jointly make up the speed-reducer transmitting mechanism 26.

The motor 24 has a rotor 23 which rotates in unison with the rotational shaft 25. The rotor 23 has its rotational angle θrm (also referred to as "motor mechanical angle") detected as a rotational angle θr thereof (also referred to as "motor electrical angle") by a resolver 58 serving as a rotational angle detector. The detected rotational angle θr is supplied through a harness 92 to a rotor rotational angle detecting circuit 76 (functioning as a motor mechanical angle calculating circuit for calculating the motor mechanical angle θrm described later) of the ECU 22. The resolver 58 is a relative angle detecting sensor. The resolver 58 may be replaced with a rotary encoder as an absolute angle detecting sensor. The difference between the rotational angle θrm (motor mechanical angle) and the rotational angle θr (motor electrical angle) will be described later.

The ECU 22 comprises a computing machine including a microcomputer, and has a CPU (Central Processing Unit), memories including a ROM (including an EEPROM) and a RAM (Random Access Memory), input/output devices including an A/D converter, a D/A converter, etc., and a timer as a timing means. The CPU reads and executes programs stored in the ROM to function as various function performing sections (function performing means), e.g., a controller, a calculator, a processor, etc.

According to the present embodiment, the ECU 22 has a storage unit 78 as a memory for storing various characteristics (including maps) described below, programs, etc. The ECU 22 functions as the torque detecting circuit 72, the steering angular velocity calculator 74, and the rotor rotational angle detecting circuit 76, which are referred to above, and also functions as an abnormality detector 80, a vehicle stop detector 82, a motor controller 84, and a timing section 85, etc.

The torque detecting circuit 72 generates a signal representative of the torque Tr (referred to as "torque Tr" for an easier understanding) from a differential signal between signals that are related to the torque Tr output through the harness 91 from the two detecting coils (not shown) of the torque sensor 20, and supplies the generated signal to the motor controller 84.

The rotor rotational angle detecting circuit 76 calculates (detects) the rotational angle (motor mechanical angle) θrm representative of the rotation of the rotor 23 of the motor 24 from the rotational angle θr (motor electrical angle) supplied from the resolver 58, and supplies the calculated rotational angle θrm to the motor controller 84 and the steering angular velocity calculator 74.

If the steering angular velocity calculator 74 is supplied with the steering angle (also referred to as "steering angle" or "steering wheel angle" of the steering shaft 14) θs from the steering angle sensor 19 that is operating normally, the steering angular velocity calculator 74 differentiates the steering angle θs that is output from the steering angle sensor 19 through the harness 91, to generate a steering angular velocity θs' (θs'=dθs/dt: d represents differential operator, and t represents time), and supplies the steering angular velocity θs' to the motor controller 84.

If the steering angle sensor 19 becomes abnormal or the vehicle is originally not equipped with the steering angle sensor 19, then the steering angular velocity calculator 74 differentiates, with respect to time, an estimated steering angle θsc calculated from the motor mechanical angle θrm, which is calculated by the rotor rotational angle detecting circuit 76 based on the rotational angle θr of the resolver 58, to calculate an estimated steering angular velocity θsc' (θsc'=dθsc/dt: d represents differential operator, and t represents time).

The abnormality detector 80 monitors the torque Tr output from the torque detecting circuit 72 and the steering angle θs output from the steering angle sensor 19. If the abnormality detector 80 detects an abnormality such as a fusing failure between the terminals of the torque sensor 20 and the harness 91, an open circuit of the harness 91 (a disconnection of the harness 91) or a short circuit between wires in the harness 91, or an abnormality of a differential amplifier or the like in the torque detecting circuit 72, e.g., an output voltage fixed to 0 volts or an output voltage other than a voltage range from 0 volts to 5 volts, then the abnormality detector 80 supplies an abnormality detection signal Sab to the motor controller 84 and the steering angular velocity calculator 74.

The motor controller 84 and the vehicle stop detector 82 of the ECU 22 are supplied with an output signal from a vehicle speed sensor 86 which detects a vehicle speed Vs from the rotational speed of the front and rear road wheels or the transmission, i.e., are supplied with the vehicle speed Vs, through a harness 94.

The vehicle stop detector 82 and the motor controller 84 of the ECU 22 are also supplied with a brake operation signal Sb from a parking brake 88 through a harness 95.

Actually, the signals such as the vehicle speed Vs and the brake operation signal Sb are supplied to the ECU 22 via an intravehicular network such as a CAN (Controller Area Network) or the like. Alternatively, the vehicle speed sensor 86 and the parking brake 88 may be connected to the ECU 22 by a point-to-point wiring system rather than an intravehicular network.

When the brake operation signal Sb from the parking brake 88 is detected or the vehicle speed Vs is detected as falling to zero, the vehicle stop detector 82 supplies the motor controller 84 with a vehicle stop detection signal Sstop.

For determining an assistive electric current Ia for the motor 24 which corresponds to the assistive torque Ta, the motor controller 84 refers to the characteristics (to be described later) stored in the storage unit 78 (characteristics storage unit) based on the rotational angle (motor mechanical angle) θrm of the rotor 23, the estimated steering angle θsc, the estimated steering angular velocity θsc', the abnormality detection signal Sab, the vehicle speed Vs, and the brake operation signal Sb, as well as the torque Tr and the steering angular velocity θs'. The motor controller 84 then determines the assistive electric current Ia by executing a program, and supplies the determined assistive electric current Ia to the coils in the respective phases of the stator of the motor 24 through a harness 93.

The motor 24 generates an assistive torque Ta depending on the supplied assistive electric current Ia, and applies the generated assistive torque Ta to the output shaft 42 through the speed-reducer transmitting mechanism 26, thereby generating a steering assistive force for the steering shaft 14.

Characteristic operation of the electric power steering apparatus 10 according to the present embodiment which is basically constructed and operated as described above will be described below with reference to flowcharts, etc.

Figure 3:
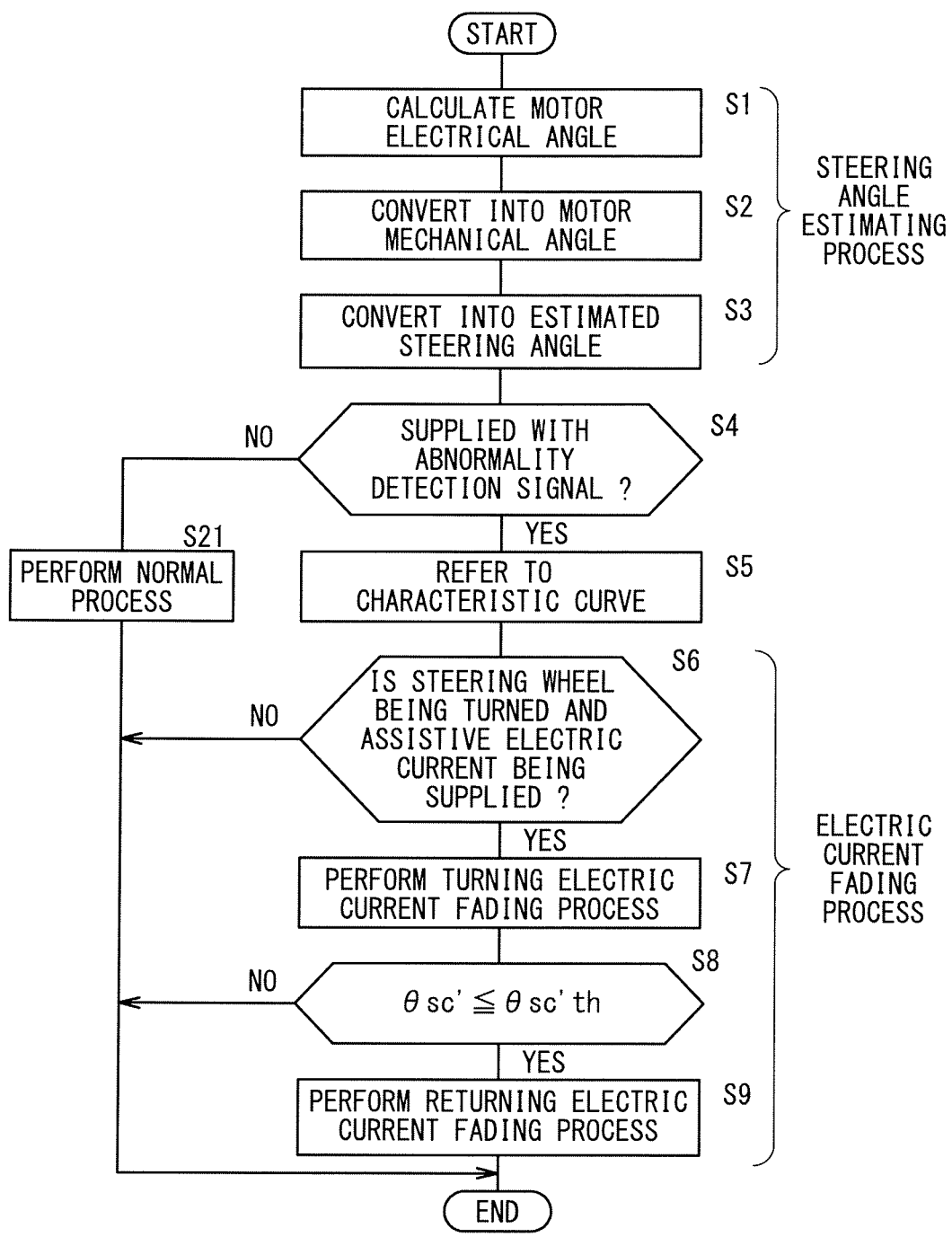
FIG. 3 is a flowchart of a steering angle estimating process and an electric current fading process.

FIG. 3 is a flowchart illustrative of an operation sequence of the electric power steering apparatus 10 according to the present embodiment. The operation sequence according to the flowchart is repeatedly carried out at given time intervals.

The ECU 22 performs a steering angle estimating process (estimated steering angle calculating process) in steps S1 through S3 irrespectively of whether the torque sensor 20 and the steering angle sensor 19 are abnormal or normal.

In step S1, the rotor rotational angle detecting circuit 76 integrates the rotational angle θr (electrical angle of the rotor 23) detected by the resolver 58 to calculate a motor electrical angle θre.

Then, in step S2, the rotor rotational angle detecting circuit 76 multiplies the calculated motor electrical angle θre by the number of pole pairs of the resolver 58 to calculate a motor mechanical angle θrm which represents the rotational angle of the rotor 23 (rotational shaft 25) (i.e., converts the motor electrical angle θre into the motor mechanical angle θrm) according to the expression (1) below, and supplies the motor mechanical angle θrm to the motor controller 84 and the steering angular velocity calculator 74.

Motor mechanical angle=motor electrical angle×number of resolver pole pairs $$\theta rm = \theta re \times \text{number of resolver pole pairs} \quad (1)$$

Then, the motor controller 84 and/or the rotor rotational angle detecting circuit 76 converts the calculated motor mechanical angle θrm into a steering angle (estimated steering angle) θsc of the steering shaft 14 according to the expression (2) below in step S3:

Estimated steering angle=motor mechanical angle× (ratio between the rotational shaft of the motor 24 and the rotational shaft of the steering system 18)=motor mechanical angle×speed reduction ratio of the speed-reducer transmitting mechanism 26

$$\theta sc = \theta rm \times \text{speed reduction ratio of the speed-reducer transmitting mechanism 26} \quad (2)$$

The speed reduction ratio of the speed-reducer transmitting mechanism 26 is set to a value of 1/20 in the present embodiment. According to the present embodiment, specifically, the motor mechanical angle θrm of 360 [deg] is converted into an estimated steering angle θsc of 18 (=360/20) [deg] which represents the estimated rotation of the steering wheel 12 (output shaft 42). Similarly, a motor rotational speed N, e.g., N=2 [rps], which represents the rotational number of the rotor 23 of the motor 24 per second corresponds to a rotational speed (estimated steering rotational speed) Nsc=0.1 (=2/20) [rps] of the steering wheel 12 (output shaft 42).

The estimated steering rotational speed Nsc=0.1 [rps] of the steering wheel 12 (output shaft 42) corresponds to an estimated steering angular velocity θsc'=36 (0.1 [rps]×360 [deg]) [deg/s]. Therefore, the motor rotational speed N and the estimated steering angular velocity (rotational angular velocity) θsc' are in one-to-one correspondence. For example, a motor rotational speed N=2 [rps] corresponds to an estimated steering angular velocity θsc'=36 [deg/s].

The motor rotational speed N and the estimated steering rotational speed Nsc are calculated by the motor controller 84.

As shown in FIG. 1, when the output shaft 42 rotates in unison with the steering shaft 14 that is fixed to the steering wheel 12, the worm wheel gear 56 coaxially secured to the output shaft 42 rotates in unison therewith. The worm gear 54 is then rotated, thereby rotating the rotational shaft 25 (rotor 23) of the motor 24 fixed to the worm gear 54 in unison therewith. The rotation of the rotor 23 is now detected by the resolver 58. As a result, it is possible to calculate (detect) an estimated steering angle θsc which represents an estimate of the steering angle θs representing the rotational angle of the steering wheel 12, based on the rotational angle θr detected by the resolver 58.

The steering angle θs and the estimated steering angle θsc are positive when the steering wheel 12 is rotated to the right and negative when the steering wheel 12 is rotated to the left. For making a right turn from a straight-running state where the vehicle is traveling straight (θs=θsc=0 [deg]), the driver rotates the steering wheel 12 to the right, thereby turning the steering wheel 12, and thereafter rotates the steering wheel 12 to the left, thereby returning the steering wheel 12, so that the vehicle is steered back into the straight-running state. Therefore, when the driver makes a right turn from the straight-running state and then steers back the vehicle into the straight-running state, basically rotating the steering wheel 12 to the right refers to a turning direction (i.e., turning the steering wheel 12), and rotating the steering wheel 12 to the left refers to a returning direction (i.e., returning the steering wheel 12).

On the other hand, for making a left turn from the straight-running state (θs=θsc=0 [deg]), the driver rotates the steering wheel 12 to the left, thereby turning the steering wheel 12, and thereafter rotates the steering wheel 12 to the right, thereby returning the steering wheel 12, so that the vehicle is steered back into the straight-running state. Therefore, when the driver makes a left turn from the straight-running state and then steers back the vehicle into the straight-running state, basically rotating the steering wheel 12 to the left refers to a turning direction (i.e., turning the steering wheel 12), and rotating the steering wheel 12 to the right refers to a returning direction (i.e., returning the steering wheel 12).

When the steering wheel 12 is rotated to the right from the straight-running state (a neutral state where the steering wheel 12 is neutral), the steering angle θs (estimated steering angle θsc) is of a positive value, and when the steering wheel 12 is rotated to the left from the straight-running state (the neutral state), the steering angle θs (estimated steering angle θsc) is of a negative value. Since the concurrent presence of positive and negative signs tends to make the discussion of the magnitude of angles complex, a case wherein the driver makes a right turn from the straight-running state and then steers the vehicle back into the straight-running state (i.e., the first quadrant of a coordinate system representing steering assistive characteristics) will be described as an example below unless otherwise noted. In such a case, both the steering angle θs and the estimated steering angle θsc are of positive values.

According to the processing of steps S1 through S3, even if the steering angle sensor 19 and the torque sensor 20 become abnormal, the rotor rotational angle detecting circuit 76, the steering angular velocity calculator 74, and the motor controller 84 can estimate a steering angle θs [deg] as an estimated steering angle θsc [deg] and determine an estimated steering angular velocity θsc' [deg/s], based on the rotational angle θr detected by the resolver 58.

The steering assistive force which is applied to the steering wheel 12 by energizing the motor 24 is basically applied in the direction in which the steering angle θs or the estimated steering angle θsc changes.

Then, in step S4, it is detected whether an abnormality detection signal Sab has been supplied from the abnormality detector 80 or not. If an abnormality detection signal Sab about the torque sensor 20 and the steering angle sensor 19 is detected in step S4, then the motor controller 84 carries out a processing sequence from step S5. For the torque sensor 20 which houses the steering angle sensor 19 therein as shown in FIG. 1, in many cases, an open circuit or a short circuit of the harness 91 causes a power cutoff, which makes the output signals from the steering angle sensor 19 and the torque sensor 20 go abnormal simultaneously.

If the motor controller 84 does not detect an abnormality detection signal Sab in step S4, then a normal process (normal-mode assistive process) is carried out in step S21. In the normal process, since the torque sensor 20 and the steering angle sensor 19 are operating normally, a steering assistive force is applied as usual.

Figure 4A:
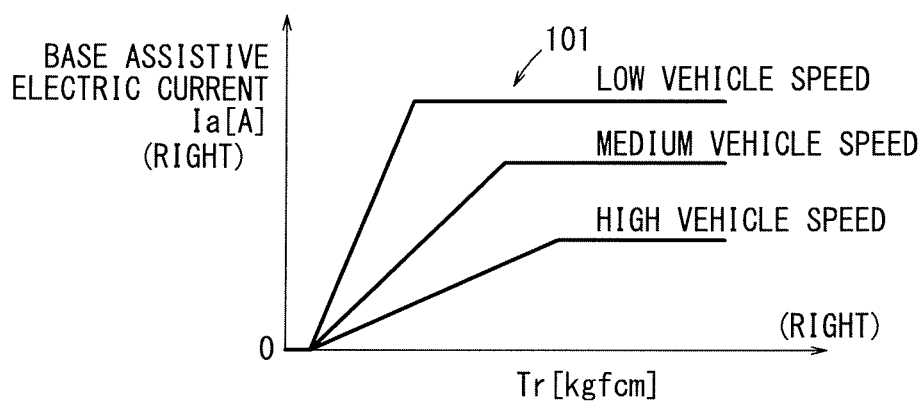
FIG. 4A is a diagram illustrative of base assistive electric current characteristics referred to in a normal-mode assistive process.

More specifically, the motor controller 84 refers to (searches) characteristic curves (also referred to as "base assistive electric current characteristic curves" or "base assistive characteristic curves") 101 representing a base assistive electric current Ia [A] versus a steering torque Tr [kgfcm] with respect to a parameter representative of the vehicle speed Vs, as shown in FIG. 4A, which is stored in the storage unit 78, and calculates a base assistive electric current Ia which is basically greater as the vehicle speed Vs is lower. The motor controller 84 then energizes the motor 24 with the calculated base assistive electric current Ia.

If the motor controller 84 detects an abnormality detection signal Sab indicating that the torque sensor 20 or the like is abnormal in step S4, then an abnormal-mode assistive process is carried out in step S5.

Figure 4B:
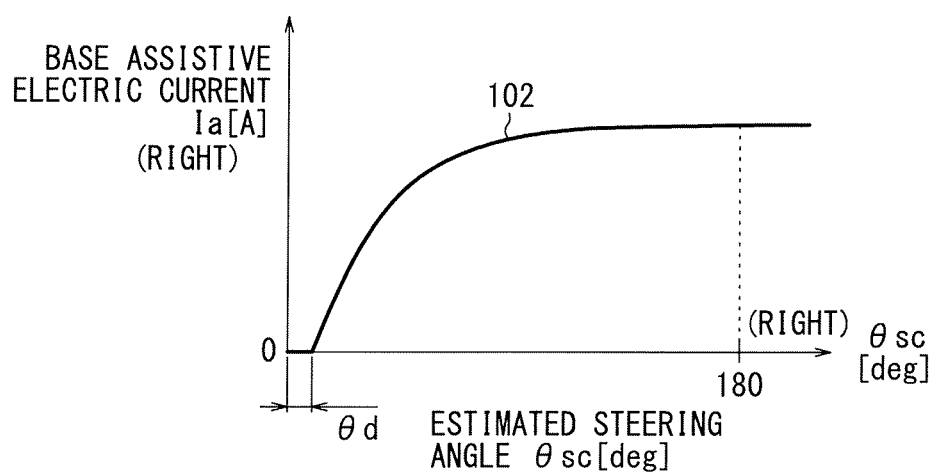
FIG. 4B is a diagram illustrative of base assistive electric current characteristics referred to in an abnormal-mode assistive process.

In step S5, the motor controller 84 refers to (searches) a characteristic curve (also referred to as "base assistive electric current characteristic curve" or "base assistive characteristic curve") 102 representing a base assistive electric current Ia [A] versus an estimated steering angle θsc, as shown in FIG. 4B, which is stored in the storage unit 78, and calculates a base assistive electric current Ia. The motor controller 84 then energizes the motor 24 with the calculated base assistive electric current Ia.

The base assistive electric current characteristic curve 102 may be stored as a map in the storage unit 78, or may be stored as a calculating formula in the storage unit 78. If it is to be stored as a map of discrete values in the storage unit 78, then values between the discrete values should preferably be determined according to an interpolating process.

As shown in FIG. 4B, when the steering angle θsc [deg] is in the vicinity of a neutral position in a range from 0 [deg] to a dead-zone steering angle θd [deg] (which ranges from 0 to 10 [deg], but is set to 10 [deg] in the present embodiment), the base assistive electric current characteristic curve 102 represents a base assistive electric current Ia=0 [A] (i.e., no assistive electric current Ia is supplied). When the steering angle θsc [deg] is in excess of the dead-zone steering angle θd [deg], the base assistive electric current characteristic curve 102 represents an assistive electric current which increases as the steering angle θsc is greater, i.e., which increases substantially in proportion to the steering angle θsc. When the steering angle θsc is much greater, the base assistive electric current characteristic curve 102 represents a base assistive electric current Ia which increases at a reduced rate. When the steering angle θsc is near or greater than 180 [deg], the base assistive electric current characteristic curve 102 represents a base assistive electric current Ia which is of a constant value, i.e., which is of a saturated value.

According to the present embodiment, even in the event of an abnormality condition wherein the abnormality detection signal Sab is detected, a steering assistive control process is carried out to supply the assistive electric current Ia based on the base assistive electric current characteristic curve 102. However, the steering assistive control process in the event of an abnormality condition is a tentative assistive process, and has various limitations as described later.

The electric power steering apparatus 10 according to the present embodiment includes the torque sensor 20 as a torque detector for detecting a torque Tr generated in the steering system 18, the motor 24 for applying an assistive torque Ta to the output shaft 42 which serves as a rotational shaft of the steering system 18, the resolver 58 as a rotational angle detector for detecting a rotational angle θr of the rotor 23 of the motor 24, and the motor controller 84 for controlling an electric current for energizing the motor 24 based on the torque Tr detected by the torque sensor 20, wherein the electric power steering apparatus 10 is characterized by the abnormality detector 80 for detecting whether the torque sensor 20 and the torque detecting circuit 72 have become abnormal or not, wherein if the abnormality detector 80 detects an abnormality of the torque sensor 20 or the torque detecting circuit 72, the motor controller 84 calculates an estimated steering angle θsc {see the expression (2) above} by calculating a motor mechanical angle θrm based on a motor electrical angle θre which represents an integrated value of the rotational angle θr detected by the resolver 58, calculates a base assistive electric current Ia [A] by referring to the base assistive electric current characteristic curve 102 representing the base assistive electric current Ia [A] versus the estimated steering angle θsc, and energizes the motor 24 with the calculated base assistive electric current Ia.

Even in the event of an abnormality condition wherein the torque sensor 20 or the torque detecting circuit 72 is detected as being abnormal and the torque sensor 20 fails to detect the steering torque Tr, therefore, the motor 24 is energized to generate an assistive torque Ta for thereby applying a steering assistive force to the steering wheel 12.

When the torque sensor 20 is normal, if the output signal from the torque sensor 20 is substantially zero and the value of the vehicle speed Vs detected by the vehicle speed sensor 86 represents a substantially constant speed which has continued for a prescribed period of time, a midpoint (neutral state) correcting process is carried out to update the stored value of the estimated steering angle θsc corresponding to the rotational angle θr output from the resolver 58 as zero (θsc=0 [deg]).

Since the steering assistive force generated using the rotor rotational angle detecting circuit 76 is applied according to a tentative steering assistive process, when the abnormality detector 80 detects an abnormality of the torque sensor 20 or the like, a speech or visual signal indicates to the operator (driver) that the tentative steering assistive process based on the abnormality is in execution. The operator (driver) can drive the vehicle to a safe place with the assistive force generated by the tentative electric power steering process based on the rotational angle θr of the rotor 23 of the motor 24.

The assistive force generated by the tentative electric power steering process has various limitations compared with the normal-mode assistive process in step S21 in which the torque sensor 20 or the like is normal.

An electric current fading process in steps S6 through S9 as one of the limitations will be described below.

Figure 5:
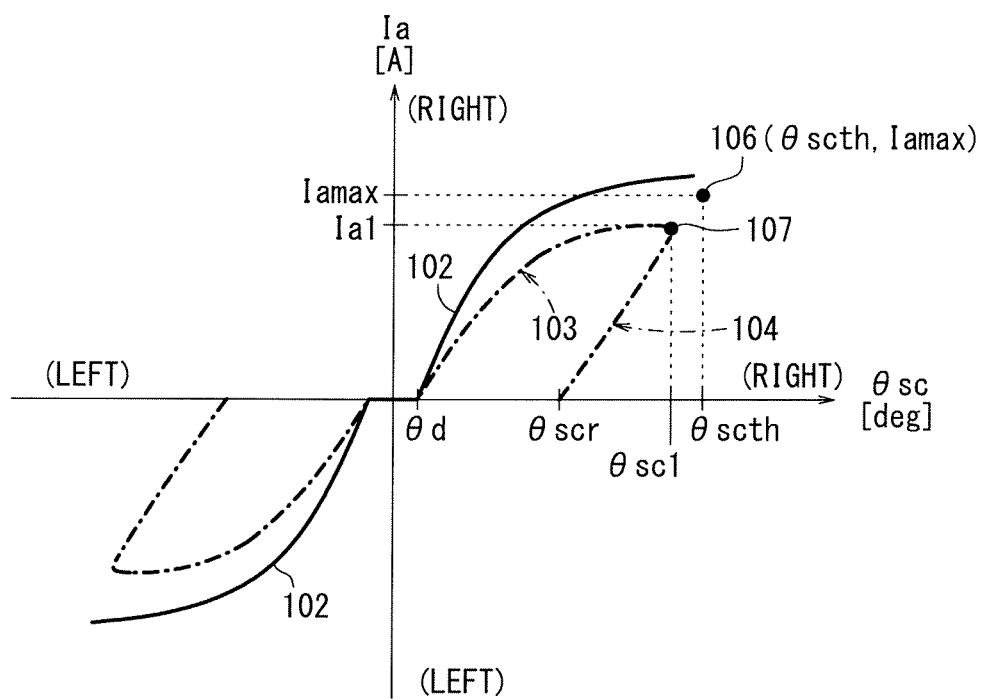
FIG. 5 is a diagram illustrative of electric current fading characteristics.

FIG. 5 shows a turning electric current fading characteristic curve (also referred to as "turning-mode electric current fading characteristic curve") 103 and a returning electric current fading characteristic curve (also referred to as "returning-mode electric current fading characteristic curve") 104, which are stored in the storage unit 78 for use in the electric current fading process, and also shows part of the base assistive electric current characteristic curve 102 shown in FIG. 4B. For an easier understanding of the present embodiment, the characteristic curves in the first quadrant shown in FIG. 5 (i.e., the characteristic curves in a rightward turning direction from 0 [deg] toward positive greater values along the horizontal axis and in a returning direction from positive greater values toward positive smaller values near 0 [deg] along the horizontal axis) will be described below.

In step S6, it is judged whether the assistive electric current Ia is being supplied and the steering wheel 12 is being turned or not based on the estimated steering angular velocity θsc' which represents a derivative of the estimated steering angle θsc. The estimated steering angular velocity θsc' is calculated by the steering angular velocity calculator 74 or the motor controller 84.

If the steering wheel 12 is being turned, then an assistive electric current Ia is determined according to the turning electric current fading characteristic curve 103, and the motor 24 is energized by the determined assistive electric current Ia.

Figure 6:
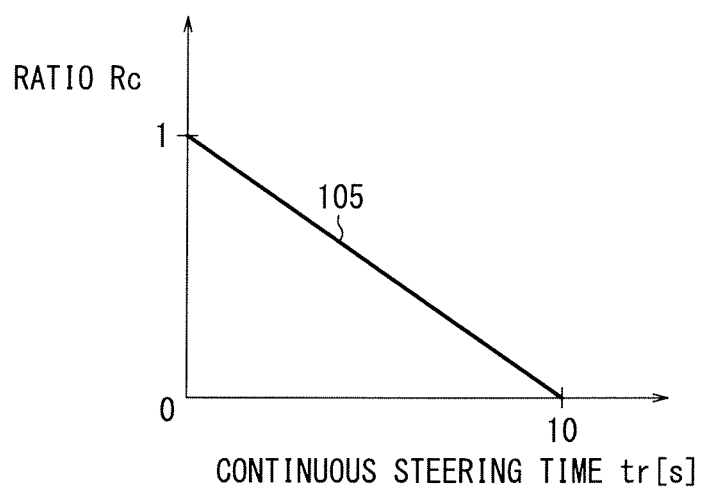
FIG. 6 is a diagram illustrative of continuous steering time reducing characteristics.

In FIG. 5, the turning electric current fading characteristic curve 103, which is indicated as a dot-and-dash-line curve, has its assistive quantity (assistive electric current Ia) smaller than the base assistive electric current characteristic curve 102, which is indicated as a solid-line curve, at the same estimated steering angle θsc, for preventing the steering wheel 12 from being turned excessively. In a case where the driver is continuously turning the steering wheel 12 in one direction, the motor controller 84 measures a time from the start of turning the steering wheel 12 (referred to as "continuous steering time tr" in one direction) with the timing section 85, and calculates a ratio (referred to as "continuous steering reduction ratio" or "continuous steering reduction proportion") Rc {Rc is of a value ranging from 1 (i.e., no reduction) to 0 (i.e., zero assistive electric current Ia)} by referring to a continuous steering time reduction characteristic curve 105 shown in FIG. 6.

If the vehicle is detected as being continuously steered, then the assistive electric current Ia calculated based on the estimated steering angle θsc from the base assistive electric current characteristic curve 102 is multiplied by the continuous steering reduction ratio Rc corresponding to the continuous steering time tr, generating an faded (reduced) assistive electric current Ia according to the expression (3) below:

$$Ia \leftarrow Ia \times Rc \tag{3}$$

Ia on the right side of the expression (3) represents the base assistive electric current on the base assistive electric current characteristic curve 102, and Ia on the left side of the expression (3) represents faded (reduced) assistive electric current on the turning electric current fading characteristic curve 103.

The continuous steering reduction ratio Rc represented by the continuous steering time reduction characteristic curve 105 is such that the assistive electric current Ia is reduced by 10% in one second (1 [s]). Therefore, if the steering wheel 12 is detected as being continuously turned in one direction for 10 [s] or more, then the assistive electric current Ia becomes zero.

Therefore, in a turning electric current fading process in step S7, if the steering wheel 12 is continuously turned in one direction, then the steering wheel 12 is assisted according to the turning electric current fading characteristic curve 103 whose assistive quantity (assistive electric current Ia) is smaller than those of the base assistive electric current characteristic curve 102.

In order to prevent an excessive assistive electric current from being supplied when the steering wheel 12 is turned, the assistive electric current Ia is limited to a maximum allowable assistive electric current Iamax {see a coordinate point 106 (θscth, Iamax) in FIG. 5} when the estimated steering angle θsc is equal to or greater than a threshold steering angle θscth.

In step S8, it is judged whether or not the estimated steering angular velocity θsc' (θsc'=dθsc/dt) is substantially equal to a zero value (θsc'≈0 [deg/s]), or in the present embodiment, whether or not the estimated steering angular velocity θsc' (absolute value) is equal to or smaller than, for example, a threshold steering angular velocity θsc'th=7.2 [deg/s] (which is converted into an estimated steering rotational speed Nsc=0.02 [rps], or a motor rotational speed N=0.4 [rps]) (θsc'≤θsc'th=7.2). If the answer to step S8 is affirmative, then a returning electric current fading process in step S9 is carried out in order to promote the returning motion of the steering wheel 12 when it is returned.

While the returning electric current fading process in step S9 is being carried out, an assistive electric current Ia is determined according to a returning electric current fading characteristic curve 104 shown in FIG. 5, and the motor 24 is energized with the calculated assistive electric current Ia.

According to the returning electric current fading characteristic curve 104, the assistive electric current Ia (Ia=Ia1 in FIG. 5) is gradually, e.g., proportionally and automatically, reduced from an assistive electric current Ia=Ia1 {a coordinate point 107 (θsc1, Ia1)} at the estimated steering angle θsc=θsc1 when the estimated steering angular velocity θsc' is of a value equal to or smaller than the threshold steering angular velocity θsc'th, to zero in about one second measured by the timing section 85. At this time, the returning electric current fading characteristic curve 104 has the estimated steering angle θsc returned to the left due to SAT (Self Aligning Torque), which is a force acting on the vehicle while in motion, the force tending to return the steering wheel 12 (steering system 18) to a straight-travel direction (neutral position).

As described above, the electric power steering apparatus 10 also includes the steering angular velocity calculator 74 or the motor controller 84 for calculating an estimated steering angular velocity θsc' of the output shaft 42 as the rotational shaft of the steering system 18. When the steering wheel 12 is turned, the motor controller 84 fades the assistive electric current Ia with which to energize the motor 24, according to the returning electric current fading characteristic curve 104 {whose gradient changes depending on the load (front-axle weight of the vehicle) of each individual vehicle, the vehicle speed Vs, the road condition, etc.} at the time when the absolute value of the estimated steering angular velocity θsc' calculated by the steering angular velocity calculator 74 is in the vicinity of zero (for example, the threshold steering angular velocity θsc'th=7.2 [deg/s] as described above), thereby preventing an excessive assistive electric current from being supplied.

In the event that the steering angle sensor 19 combined with the torque sensor 20 or a steering angle sensor provided independently of the torque sensor 20 operates normally, the steering angle θs output from the steering angle sensor 19 or the independent steering angle sensor may be differentiated to calculate a steering angular velocity θs' for performing an electric current fading process.

When the vehicle stop detector 82 detects either a vehicle speed Vs [km/h]=0 from the vehicle speed sensor 86 or the brake operation signal Sb from the parking brake 88, the vehicle stop detector 82 supplies a vehicle stop detection signal Sstop to the motor controller 84. At this time, the motor controller 84 sets the assistive electric current Ia to zero, so that no unnecessary steering assistive force will be applied.

In the present invention, if the parking brake 88 is released and the drive road wheels are being rotated by the engine or the like, e.g., if the drive road wheels are being idly rotated when the vehicle is lifted up in a service shop or the like, the assistive electric current Ia may not be supplied when the vehicle speed Vs detected by the vehicle speed sensor 86 is Vs=0, such that the vehicle will not be "self-steered".

According to the above embodiment, as described above, even if the torque sensor 20 fails and is unable to detect the steering torque Tr, a steering assistive force generated by the motor 24 can be applied, using an estimated steering angle θsc and an estimated steering angular velocity θsc' which represent estimated values of the steering angle θs and the steering angular velocity θs' based on the rotational angle θr of the rotor 23 which is detected by the resolver 58, etc. combined with the motor 24.

First Inventive Example

Steering-Maintaining-Mode Assistive Function

According to the above embodiment, the assistive electric current Ia is reduced based on the returning electric current fading characteristic curve 104 as shown in FIG. 5, thereby promoting the returning motion of the steering wheel 12. However, when the steering wheel 12 is maintained as steered (while it is being maintained as steered) in a steering maintaining mode where the estimated steering angular velocity θsc' is substantially zero, if the returning electric current fading process represented by the returning electric current fading characteristic curve 104 shown in FIG. 5 is carried out, then the assisting time in the steering maintaining mode is shortened.

In case the driver wants to maintain the steering wheel 12 as steered and the SAT is large, if the returning electric current fading process is carried out, then the driver is required to further increase a steering maintaining force (steering effort) applied to the steering wheel 12, and therefore it is preferable to continuously assist the steering wheel 12 in order to reduce the steering maintaining force applied by the driver to the steering wheel 12 in the steering maintaining mode.

According to the first inventive example, there is realized a function to reduce the steering maintaining force applied by the driver to maintain the steering wheel 12 as steered, or stated otherwise, to continue an appropriate assistive force in the steering maintaining mode.

Next, a steering-maintaining-mode assistive function according to the first inventive example will be described below with reference to flowcharts shown in FIGS. 7 and 8 and characteristic curves shown in FIG. 9.

Figure 7:
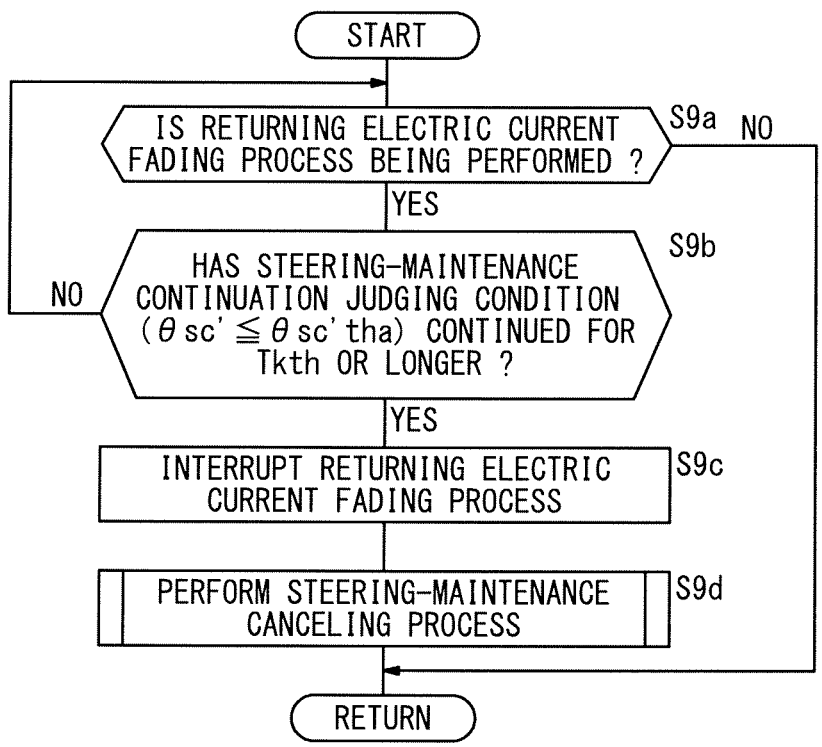
FIG. 7 is a flowchart of a process of interrupting a steering-maintaining-mode returning electric current fading process according to the first inventive example.
Figure 8:
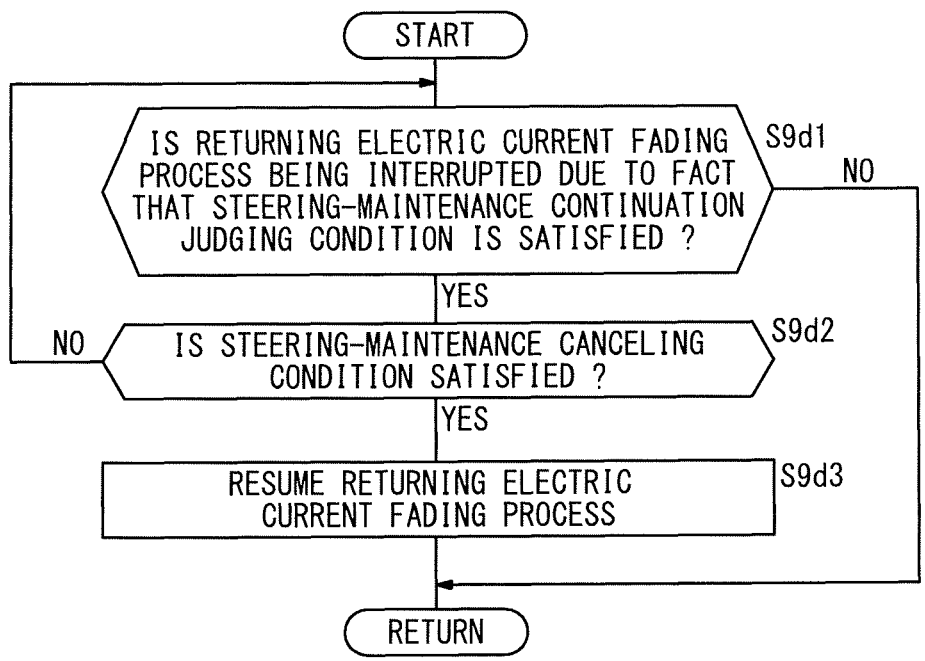
FIG. 8 is a flowchart of a process of resuming the process of interrupting the steering-maintaining-mode returning electric current fading process according to the first inventive example.

The flowchart shown in FIG. 7 shows details of the "returning electric current fading process" in step S9 in the flowchart shown in FIG. 3, and the flowchart shown in FIG. 8 shows details of a "steering-maintenance canceling process" in step S9d in the flowchart shown in FIG. 7. For an easier understanding of the first inventive example, the characteristic curves shown in FIG. 9 represent the characteristic curves in the first quadrant shown in FIG. 5 at an enlarged scale.

If the estimated steering angular velocity θsc' is of value equal to or smaller than the threshold steering angular velocity θsc'th=7.2 [deg/s] in step S8, then the returning electric current fading process is carried out in step S9. In step S9a shown in FIG. 7, it is judged whether the returning electric current fading process is being carried out or not. If the returning electric current fading process is being carried out, then the returning electric current fading process which has been described above with reference to FIG. 5 (i.e., the process of automatically gradually reducing the assistive electric current Ia to zero in about one second measured by the timing section 85) is continued.

According to the first inventive example, while the returning electric current fading process is being continued, it is monitored in step S9b whether a steering-maintenance continuation judging condition is satisfied or not. The steering-maintenance continuation judging condition is judged as being satisfied if the steering angular velocity θsc' is of a value equal to or smaller than a threshold steering angular velocity θsc'tha (e.g. θsc'tha=3.6 [deg/s]) that is a relatively small value, by which the steering maintaining mode is regarded as being continued, and the time (steering-maintenance continuation time) tk (measured by the timing section 85) that has elapsed since the start of the returning electric current fading process in step S9a is equal to or longer than a prescribed time Tkth (threshold time which is shorter than about one second, the period of the returning electric current fading process corresponding to about one second, and also referred to as a threshold steering-maintenance continuation time), e.g., Tkth=500 [ms], {the state (θsc'≤θsc'tha) has continued for the prescribed time Tkth or longer}.

Figure 9:
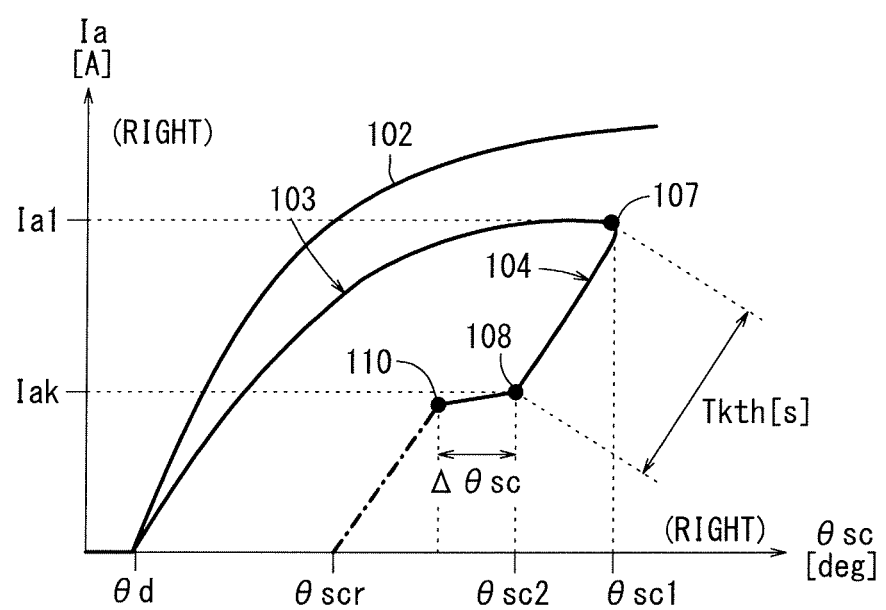
FIG. 9 is a diagram illustrative of steering-maintaining-mode assistive characteristics according to the first inventive example.

If the answer to step S9b is affirmative, i.e., if the time Tkth=500 [ms] has elapsed from the start of the returning electric current fading process based on the returning electric current fading characteristic curve 104 at the coordinate point 107 in FIG. 9, and the estimated steering angular velocity θsc' becomes a value equal to or smaller than the threshold steering angular velocity θsc'tha=3.6 [deg/s], by which the steering maintaining mode is regarded as being continued (see a coordinate point 108 in FIG. 9), then the steering maintaining mode is judged as being continued, and the returning electric current fading process is interrupted in step S9c.

At this time, the measuring by the timing section 85 of one second set for the returning electric current fading process is interrupted when the threshold steering-maintenance continuation time Tkth=500 [ms] has been measured (i.e., at the coordinate point 108) (see FIG. 9).

The assistive electric current Ia at this time (the time when the answer to step S9b is affirmative and the returning electric current fading process is interrupted in step S9c) during the returning electric current fading process is set as a steering-maintenance assistive electric current Iak at the coordinate point 108 (θsc2, Iak) in FIG. 9.

When the returning electric current fading process is interrupted based on the steering-maintenance continuation judging condition, the assistive electric current Ia is stored as the steering-maintenance assistive electric current Iak in the storage unit 78 in step S9c. The estimated steering angle θsc at this time is stored as an estimated steering angle θsc2 in the storage unit 78.

According to the first inventive example, the interruption of the returning electric current fading process based on the steering-maintenance continuation judging condition is carried out at the position of the coordinate point 108 on the returning electric current fading characteristic curve 104 shown in FIG. 9.

Basically, the steering-maintenance assistive electric current Iak at the coordinate point 108 is supplied to the motor 24 to assist the driver in maintaining the steering wheel 12 as steered until a steering-maintenance canceling condition, to be described in the following description concerning step S9d, is satisfied. With the driver being thus assisted, the steering-maintaining force applied by the driver to maintain the steering wheel 12 as steered (i.e., to turn the vehicle along a curve having a constant radius of curvature) can be reduced.

Then, the process of canceling the interrupting process, or stated otherwise, a steering-maintenance canceling process, is carried out in step S9d.

FIG. 8 is a flowchart showing details of the steering-maintenance canceling process in step S9d.

In step S9d1, it is judged whether or not the returning electric current fading process is being interrupted due to the fact that the steering-maintenance continuation judging condition is satisfied.

Since the returning electric current fading process is initially being interrupted in step S9c, the answer to step S9d1 is affirmative. Then, in step S9d2, it is judged whether a steering-maintenance canceling condition is satisfied or not.

The steering-maintenance canceling condition is judged as being satisfied when the estimated steering angle θsc based on the estimated steering angle θsc2 at the coordinate point 108 is gradually reduced, i.e., the steering wheel 12 is returned to the neutral position, and also a returning judgment steering angle Δθsc is equal to or greater than 10 [deg], for example, (θsc≤sc2−Δθsc). When the steering-maintenance canceling condition is judged as being satisfied, the steering maintaining mode in which the driver maintains the steering wheel 12 as being steered is judged as being canceled.

If the steering-maintenance canceling condition is judged as being satisfied at the position of a coordinate point 110 in FIG. 9, then the returning electric current fading process is resumed in step S9d3. The assistive electric current Ia is now automatically reduced as indicated by a dot-and-dash-line characteristic curve shown in FIG. 9.

According to the first inventive example, as described above, if the abnormality detector 80 detects that a torque detector (the torque sensor 20, the torque detecting circuit 72, and the harness 91 therebetween) has become abnormal, the motor 24 is energized by the base assistive electric current Ia which is calculated from the base assistive electric current characteristic curve 102 according to the estimated steering angle θsc based on the rotational angle θr of the rotor 23 of the motor 24 which is detected by the resolver 58 as the rotational angle detector. When the motor 24 is thus energized, if the absolute value |θsc'| of the estimated steering angular velocity (rotor angular velocity) θsc' calculated based on the rotational angle θr of the rotor 23 is equal to or smaller than the predetermined threshold steering angular velocity θsc'th (=7.2 [deg/s]) (see the coordinate point 107 in FIGS. 5 and 9), the returning-mode electric current fading process is started to reduce the base assistive electric current Ia which energizes the motor 24. After the returning-mode electric current fading process has been started, if the absolute value |esc'| of the estimated steering angular velocity θsc' continues to be equal to or smaller than the predetermined threshold steering angular velocity θsc'tha for a prescribed time (threshold steering-maintenance continuation time Tkth=500 [ms] in the above example), then the returning-mode electric current fading process which reduces the base assistive electric current Ia is interrupted at the coordinate point 108. Accordingly, an appropriate assistive force can be applied to the steering wheel 12 in the steering-maintaining mode.

In the steering-maintaining-mode assistive process wherein the assistive electric current Ia stops being reduced, if the estimated steering angle θsc is gradually reduced, i.e., the steering wheel 12 is returned to the neutral position, and then the estimated steering angle θsc is returned by an angle that is equal to or greater than the returning judgment steering angle Δθsc [deg] (prescribed value) (see the coordinate point 110), i.e., if a first steering-maintenance canceling condition is satisfied, then the steering maintaining mode by the driver is judged as being canceled, and the process for reducing the electric current is resumed. Therefore, when the steering maintaining mode is no longer required, the assistive force is reduced.

In the steering-maintaining-mode assistive process wherein the assistive electric current Ia stops being reduced, if the absolute value of the estimated steering angular velocity (estimated angular velocity) θsc' is equal to or greater than a predetermined steering-maintenance canceling judgment threshold steering angular velocity θsc'th1, i.e., if a second steering-maintenance canceling condition is satisfied, then the returning-mode electric current fading process is also resumed. Therefore, when the steering maintaining mode is no longer required, the assistive force is reduced.

Second Inventive Example

Excessive-Turning Suppressing Function

As described above, an assistive quantity (assistive characteristic) is determined depending on the estimated steering angle θsc, and a current fading quantity is adjusted by the turning-mode electric current fading process, the returning-mode electric current fading process, the steering-maintenance judging process, etc. However, after an assistive quantity (assistive characteristic) is determined on a high-μ road (μ represents a coefficient of friction), when the driver steers the vehicle on a low-μ road having a different balance between the estimated steering angle θsc and the assistive quantity required therefor, the driver may possibly turn the steering wheel 12 excessively. The balance between the estimated steering angle θsc and the assistive quantity required therefor is closely related to the magnitude of the coefficient of friction μ of the road.

According to the second inventive example, in the turning electric current fading process in step S7, based on the idea that the excessive assistive quantity should be limited in order to prevent an excessive turning of the steering wheel on a low-μ road, the motor controller 84 calculates a ratio Rm with respect to the assistive electric current Ia depending on the motor rotational speed N [rps] of the motor 24 (the ratio may be called a motor rotational speed reduction ratio or a motor rotational speed reduction proportion).

Figure 10:
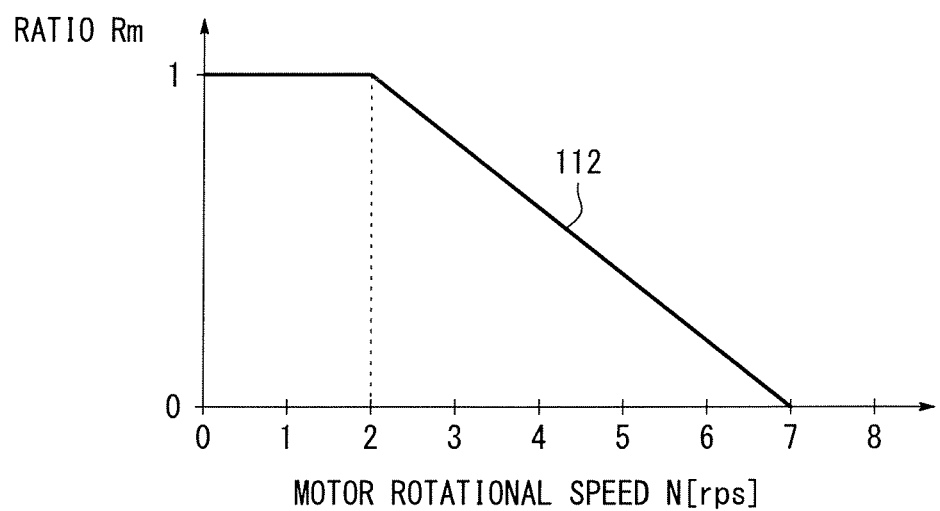
FIG. 10 is a diagram illustrative of motor rotational speed reduction ratio characteristics according to the second inventive example.

FIG. 10 shows a characteristic curve 112 of a motor rotational speed reduction ratio Rm (motor rotational speed reduction characteristic curve) according to the second inventive example.

According to the motor rotational speed reduction characteristic curve 112, when the motor rotational speed N ranges from 0 to 2 [rps] (i.e., the estimated steering angular velocity θsc' ranges from 0 to 36 [deg/s]), the motor rotational speed reduction ratio Rm is 1 (the motor rotational speed is not reduced), and when the motor rotational speed N ranges from 2 to 7 [rps] (i.e., the estimated steering angular velocity θsc' ranges from 36 to 126 [deg/s]), the motor rotational speed reduction ratio Rm is proportionally reduced from 1 to 0.

The motor rotational speed reduction ratio Rm serves as a coefficient for reducing the assistive electric current Ia in order to prevent the steering wheel 12 from being turned excessively if the estimated steering angular velocity of the steering wheel 12 turned by the driver is great.

Figure 11:
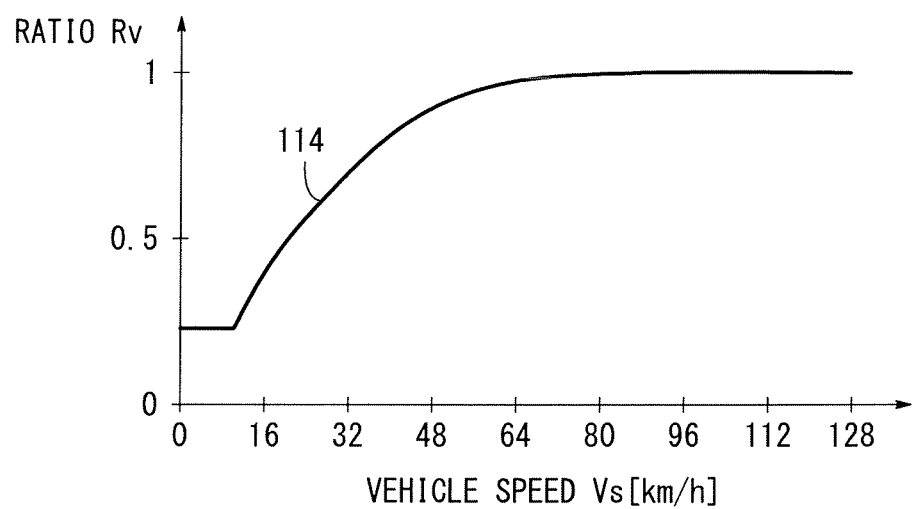
FIG. 11 is a diagram illustrative of vehicle speed ratio characteristics according to the second inventive example.

When the assistive electric current Ia is reduced according to the motor rotational speed reduction characteristic curve 112 representing the motor rotational speed reduction ratio Rm as shown in FIG. 10, a desired assistive force may not be obtained at a time when the vehicle is driven at a low speed during which the steering wheel 12 needs to be assisted. In order to prevent the argument on the horizontal axis of the graph of the motor rotational speed reduction characteristic curve 112, i.e., the motor rotational speed N, from increasing as the vehicle speed Vs becomes lower, control is performed such that the motor rotational speed N, which is the argument on the horizontal axis, is multiplied by a vehicle speed ratio Rv as shown in FIG. 11. The vehicle speed ratio Rv is represented by a characteristic curve (vehicle speed characteristic curve) 114, for example, such that it is of a value of about 0.25 when the vehicle speed Vs ranges from 0 to Vs=10 [km/h], increases substantially linearly up to a value of about 0.9 when the vehicle speed Vs ranges from 10 to 50 [km/h], and increases from about 0.9 to 1 (no reduction of the motor rotational speed) when the vehicle speed Vs ranges from 50 to 80 [km/h].

Figure 12:
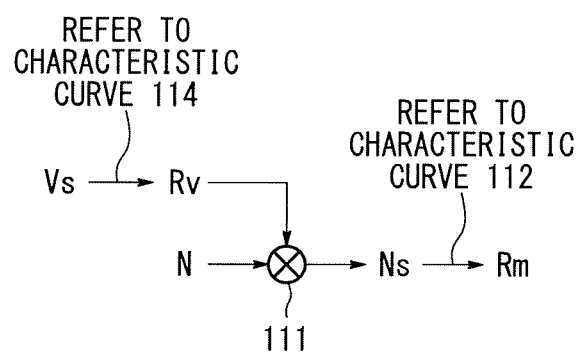
FIG. 12 is a diagram illustrative of an excessive turning suppressing function for a turning direction according to the second inventive example.

More specifically, as shown in FIG. 12, the motor controller 84 determines a vehicle speed ratio Rv from the vehicle speed Vs according to the vehicle speed characteristic curve 114 shown in FIG. 11, then multiplies the motor rotational speed N [rps] by the determined vehicle speed ratio Rv with a multiplier 111, thereby generating a corrected motor rotational speed Ns [rps], and determines a motor rotational speed reduction ratio Rm from the corrected motor rotational speed Ns according to the motor rotational speed reduction characteristic curve 112 shown in FIG. 10.

The motor controller 84 performs the turning electric current fading process described above on a corrected base assistive electric current Ia (Ia←Ia×Rm) which is produced by multiplying the base assistive electric current Ia obtained according to the base assistive electric current characteristic curve 102 by the motor rotational speed reduction ratio Rm.

With the motor 24 being thus controlled, it is possible to prevent the steering wheel 12 from being turned excessively when the vehicle is running at a high vehicle speed and also to maintain an assistive force to be applied to the steering wheel 12 when the vehicle is running at a low vehicle speed. Consequently, the assistive control process can be performed both when the vehicle is driven on a high-μ road and when the vehicle is driven on a low-μ road.

Even if the steering wheel 12 tends to be turned excessively, i.e., its steering angle θs tends to increase excessively, due to a disturbance input from road wheels such as the steerable road wheels 16, the motor rotational speed reduction ratio Rm may be used to prevent the steering wheel 12 from being turned excessively. Accordingly, the electric power steering apparatus 10 is able to have desired disturbance resistance (disturbance toughness).

According to the second inventive example, as described above, the electric power steering apparatus 10 includes the steering wheel 12 as an operating member which is operated by the driver to steer the vehicle, the torque sensor 20 as a torque detector for detecting a torque Tr generated by the steering system 18 of the vehicle, the vehicle speed sensor 86 as a vehicle speed detector for detecting a vehicle speed Vs of the vehicle, the motor 24 for applying an assistive torque to the output shaft 42 as a rotational shaft of the steering system 18, the resolver 58 as a rotational angle detector for detecting a rotational angle of the steering system 18, and the motor controller 84 for controlling an electric current (assistive electric current) Ia to energize the motor 24 based on the torque Tr detected by the torque sensor 20. The electric power steering apparatus 10 also includes the abnormality detector 80 for detecting whether the torque sensor 20, etc. becomes abnormal or not, and the storage unit 78 storing, as the characteristic curve 102, the relationship between the rotational angle θr detected by the resolver 58 and the electric current Ia to energize the motor 24. When the abnormality detector 80 detects an abnormality of the torque sensor 20, etc., the motor controller 84 energizes the motor 24 based on the rotational angle θr detected by the resolver 58 and the characteristics 102. When the motor controller 84 energizes the motor 24, it uses the motor rotational speed reduction ratio Rm (see FIG. 10) in order to reduce the electric current Ia for energizing the motor 24 as the motor rotational speed N corresponding to an estimated steering angular velocity (rotational angular velocity) θsc' calculated based on the rotational angle θr increases.

According to the second inventive example, when the abnormality detector 80 detects an abnormality of the torque sensor 20, etc., the motor controller 84 energize the motor 24 based on the rotational angle θr detected by the resolver 58 and the characteristics 102. When the motor controller 84 energizes the motor 24, it reduces the electric current Ia for energizing the motor 24 as the motor rotational speed N {estimated steering angular velocity (rotational angular velocity) θsc'} calculated based on the rotational angle θr increases. Consequently, when the torque sensor 20 becomes abnormal, the driver is prevented from turning the steering wheel 12 excessively in its turning direction, and an appropriate assistive force is applied to the steering wheel 12.

The motor controller 84 corrects the motor rotational speed N detected by the resolver 58 so as to be lower as the vehicle speed Vs becomes smaller than a prescribed vehicle speed (about 80 [km/h] in FIG. 11) by use of the vehicle speed ratio Rv, and energizes the motor 24 based on the corrected motor rotational speed Ns (see FIG. 12) and the characteristics 102. Stated otherwise, the motor controller 84 energizes the motor 24 with the corrected motor rotational speed Ns (corrected rotational angular velocity) which is obtained by correcting the motor rotational speed N {estimated steering angular velocity (rotational angular velocity) θsc'} serving as an argument of the electric current Ia for energizing the motor 24, such that the motor rotational speed N decreases as the vehicle speed Vs becomes smaller than the prescribed vehicle speed. Accordingly, an assistive force to be applied to the steering wheel 12 is maintained at a time when the vehicle is running at a prescribed vehicle speed or lower during which a more steering force is required.

According to the second inventive example, even when the torque sensor 20, etc. fails and is unable to detect the steering torque Tr, a steering assistive force generated by the motor 24 may be applied to the steering wheel 12 both in the turned and returned directions, based on the motor rotational speed N {estimated steering angular velocity (rotational angular velocity) θsc'} of the motor 24. Especially when the steering wheel 12 is turned, the assistive force is controlled so as to decrease as the motor rotational speed N {estimated steering angular velocity (rotational angular velocity) θsc'} increases. Therefore, the steering wheel 12 is prevented from being turned excessively, and an appropriate assistive force is applied to the steering wheel 12.

Third Inventive Example

Ultra-Low-Speed Traveling Range Returning-Mode Steering Force Reducing Function

If the estimated steering angle θsc is not yet zero, but has a remaining value in the right direction when the assistive electric current Ia becomes zero according to the returning electric current fading process based on the returning electric current fading characteristic curve 104 described with reference to FIG. 5 or 9 (in FIGS. 5 and 9, different values of remaining estimated steering angle θscr are left), or stated otherwise, if the vehicle is running in an ultra-low-speed traveling range with the vehicle speed Vs being equal to or lower than Vs1=20 [km/h] when the assistive electric current Ia in the right direction, i.e., the direction in which the steering wheel 12 is turned, is zero or nearly zero while a returning angle in the left direction remains, then the force tending to return the steering wheel 12 (steering system 18) to a straight-travel direction (neutral position) due to the SAT is weak, and the driver is required to apply a greater steering force (steering torque) to return the steering wheel 12.

According to the third inventive example, when the assistive electric current Ia becomes zero according to the electric current fading process based on the returning electric current fading characteristic curve 104, even if the estimated steering angle θsc is not zero, but has a remaining value in the right direction (also referred to as a remaining estimated steering angle θscr), a returning assistive force can be applied to the steering wheel 12 (steering system 18).

An ultra-low-speed traveling range returning-mode steering force reducing function according to the third inventive example will be described below with reference to a flowchart shown in FIG. 13 and characteristic curves shown in FIGS. 14 and 15.

Figure 13:
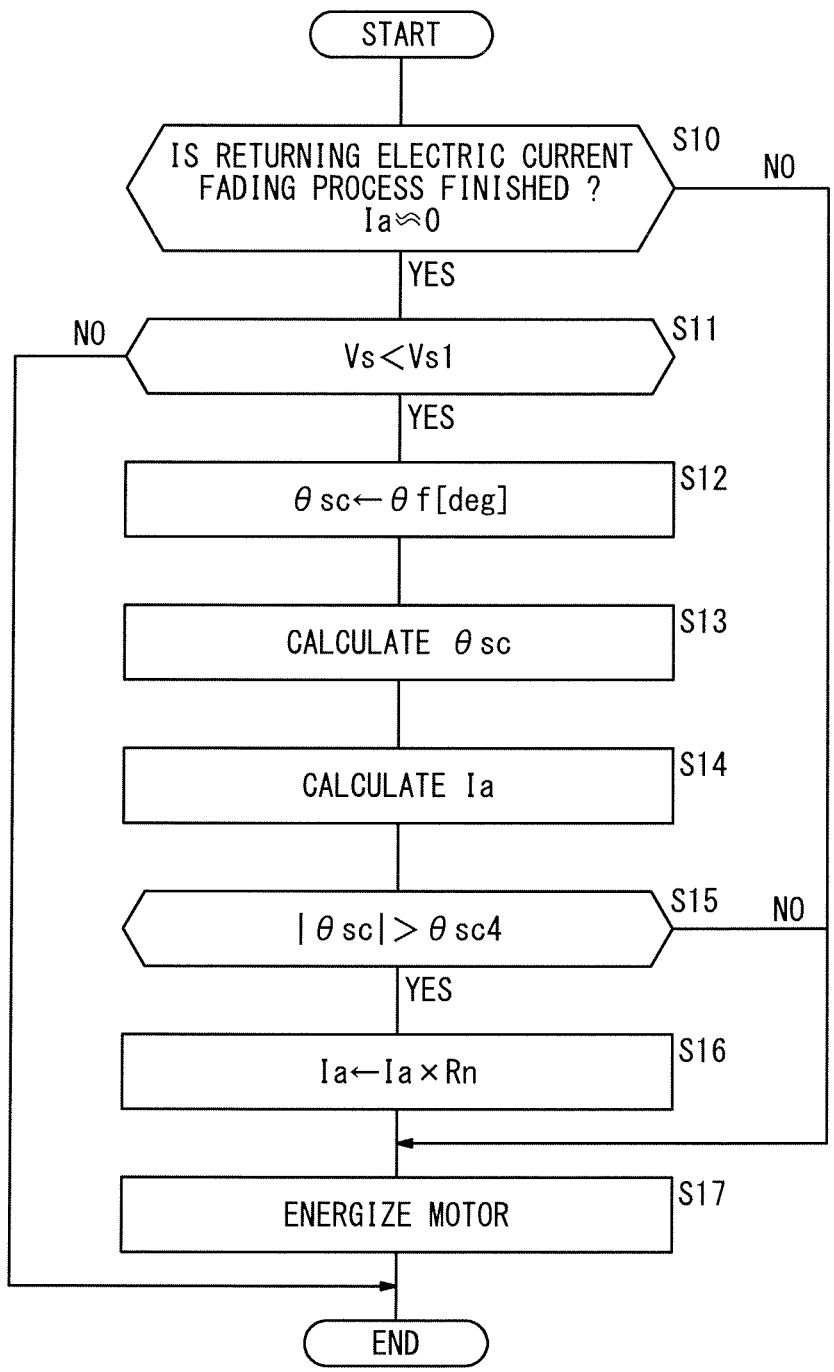
FIG. 13 is a flowchart of an ultra-low-speed traveling range returning-mode steering force reducing process according to the third inventive example.

In step S10 shown in FIG. 13, which is carried out after step S9 shown in FIG. 3, the motor controller 84 judges whether the returning electric current fading process based on the returning electric current fading characteristic curve 104 is finished or not based on the value of the assistive electric current Ia.

More specifically, if the answer to step S10 is affirmative with the assistive electric current Ia being substantially zero (Ia≈0) and the estimated steering angle θsc remains to be equal to or greater than the dead-zone steering angle θd (the remaining estimated steering angle θscr is left in FIGS. 5 and 9), then the motor controller 84 judges in step S11 whether the vehicle speed Vs is lower than an ultra-low vehicle speed Vs1 (Vs1≈20 [km/h]) (Vs<Vs1) or not. The ultra-low vehicle speed Vs1 may be set to a value in the range from 5 to 20 [km/h] depending on the type of the vehicle.

If the vehicle speed Vs is not lower than the ultra-low vehicle speed Vs1 (step S11: NO), then as the SAT is applied, control goes back to step S1. Then, steps S1, S2, S3, S4 (YES), S5, and S6 (YES) are sequentially performed, and thereafter, control goes back to the judgment in step S10.

If the vehicle speed Vs is lower than the ultra-low vehicle speed Vs1 and hence the answer to step S11 is affirmative, then the estimated steering angle θsc=θsc3 (also called a remaining returning angle) is reset to a reference angle θf [deg] (see FIG. 14) in step S12.

In step S13, a returning estimated steering angle (also called returning rotational angle) θsc in the returning direction is calculated in the same manner as in steps S1 through S3.

In step S14, a returning assistive electric current Ia corresponding to the returning estimated steering angle θsc is calculated based on the base assistive electric current characteristic curve 102.

In step S15, it is judged whether the absolute value |θsc| of the estimated steering angle θsc is of a value passing through a threshold estimated steering angle θsc4 (see FIG. 15) or not by way of comparison. The threshold estimated steering angle θsc4 may be set to θsc4≈30 [deg], for example.

If the answer to step S15 is negative (step S15: NO), then the assistive electric current Ia (calculated in step S14) in the returning direction based on a dot-and-dash-line characteristic curve 120 shown in FIG. 14 is supplied to energize the motor 24 in step S17.

Figure 15:
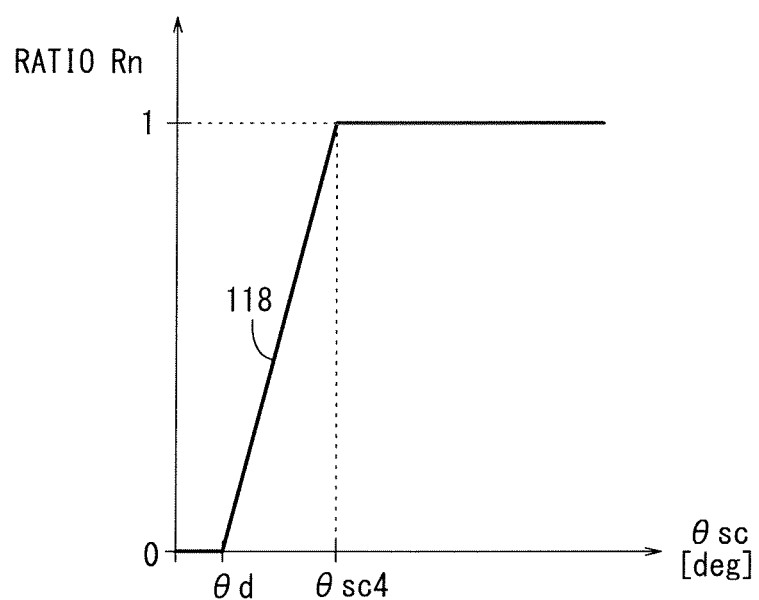
FIG. 15 is a diagram illustrative of central ratio characteristics according to the third inventive example.

If the answer to step S15 is affirmative, then a corrected assistive electric current Ia (Ia←Ia×Rn) is calculated by multiplying the uncorrected assistive electric current (i.e., assistive electric current before the correction) Ia calculated in step S14 by a center ratio (neutral position returning proportion) Rn indicated by a characteristic curve 118 shown in FIG. 15 in step S16.

Figure 14:
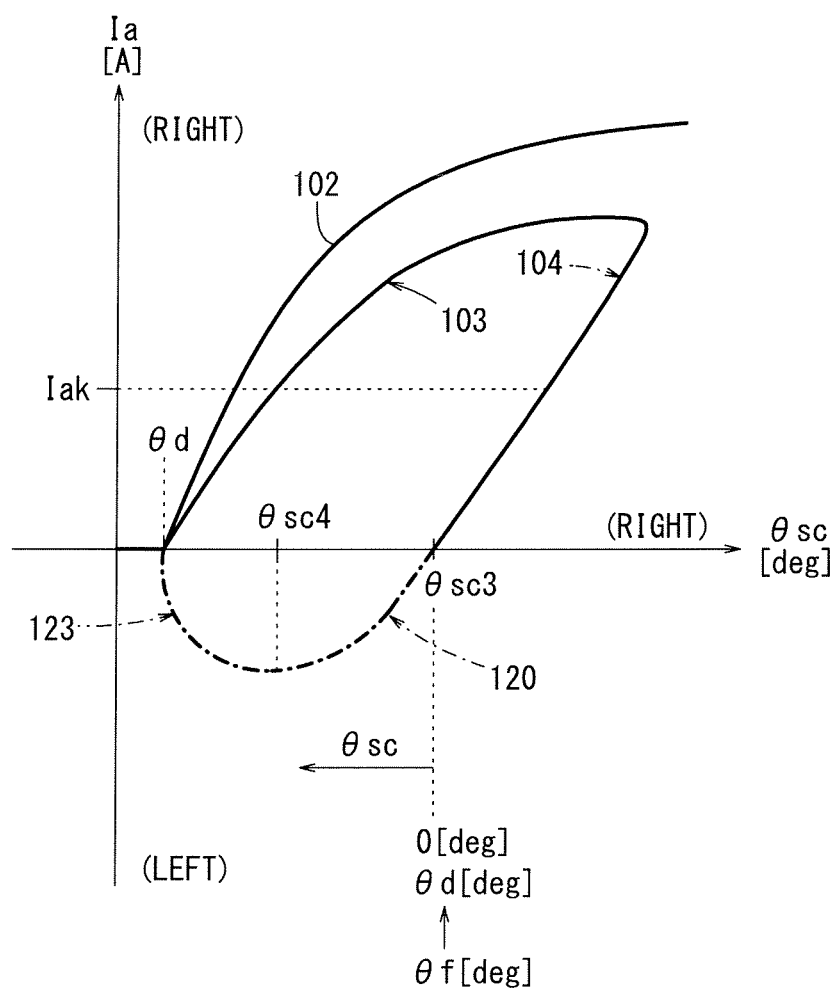
FIG. 14 is a diagram illustrative of ultra-low-speed traveling range returning-mode steering force reduction characteristics according to the third inventive example.

The center ratio Rn refers to a proportion (characteristics) by which to multiply the uncorrected assistive electric current Ia in order to gradually reduce the assistive electric current Ia to zero if the absolute value of the returning estimated steering angle θsc becomes smaller than the threshold estimated steering angle θsc4, as indicated by a characteristic curve 123 shown in FIG. 14, so that an assistive force will not be imparted beyond the neutral position (center).

In step S17, the assistive electric current Ia (characteristic curve 120) calculated in step S14 or the assistive electric current Ia (Ia←Ia×Rn) (characteristic curve 123) corrected in step S16 is supplied to energize the motor 24.

When the steering wheel 12 is returned to the neutral position, the returning rotational angle θsc is reset to assist the driver in subsequently turning and returning the steering wheel 12 appropriately according to the base assistive characteristic curve 102.

According to control based on the flowchart shown in FIG. 13, even if the turning assistive electric current Ia becomes nearly zero while a returning angle (remaining returning angle θsc3) remains, the driver is assisted in returning the steering wheel 12, and at the same time the driver is prevented from being excessively assisted in returning the steering wheel 12.

According to the third inventive example, as described above, the electric power steering apparatus 10 includes the steering wheel 12 as an operating member which is operated by the driver to steer the vehicle, the torque sensor 20 as a torque detector for detecting a torque Tr generated by the steering system 18 of the vehicle, the vehicle speed sensor 86 as a vehicle speed detector for detecting a vehicle speed Vs of the vehicle, the motor 24 for applying an assistive torque to the output shaft 42 as a rotational shaft of the steering system 18, the resolver 58 as a rotational angle detector for detecting a rotational angle θr of the steering system 18, and the motor controller 84 for controlling an electric current Ia to energize the motor 24 based on the torque Tr detected by the torque sensor 20. The electric power steering apparatus 10 also includes the abnormality detector 80 for detecting whether the torque sensor 20, etc. becomes abnormal or not, and the storage unit 78 storing, as characteristics 102, the relationship between the rotational angle θr detected by the resolver 58 and the electric current Ia to energize the motor 24. When the abnormality detector 80 detects an abnormality of the torque sensor 20, etc., the motor controller 84 detects a returning rotational angle θsc using, as the reference angle θf, the rotational angle θr detected by the resolver 58 when the turning-direction assistive electric current Ia becomes nearly zero (step S10: YES) while a returning angle remains (remaining estimated steering angle θscr=remaining returning angle θsc3) at the time the steering wheel 12 is returned during which the steering angle of the steering wheel 12 changes toward the neutral position, and energizes the motor 24 in the returning direction which is opposite to the turning direction based on the returning rotational angle θsc and the characteristic curve 102 (at this time, the motor controller 84 may carry out the electric current fading process).

As described above, the motor controller 84 detects a returning rotational angle θsc using, as the reference angle θf, the estimated steering angle θsc detected by the resolver 58 when the turning-direction assistive electric current Ia becomes nearly zero while a remaining returning angle θsc3 remains, and energizes the motor 24 in the returning direction which is opposite to the turning direction based on the returning rotational angle θsc and the characteristic curve 102. Therefore, the driver can be assisted in making the steering angle of the steering wheel 12 closer to the neutral position. The steering force applied by the driver to the steering wheel 12 to return the steering wheel 12 can be reduced, making it easy for the driver to return the steering wheel 12 to the neutral position.

When the steering wheel 12 is returned, energization of the motor 24 is allowed if the vehicle speed Vs is equal to or lower than the ultra-low vehicle speed Vs1 as a prescribed vehicle speed. Therefore, even when the SAT (Self Aligning Torque) is weak, the steering force applied by the driver to return the steering wheel 12 can be reduced.

It is preferable to multiply the electric current Ia for driving the motor 24 at the time the steering wheel 12 is returned, by a prescribed coefficient depending on the steerability of the vehicle. Since the steerability of the vehicle varies with the magnitude of the load imposed on each vehicle (the front axle weight of the vehicle), it is possible to provide optimum steering assistance depending on the steerability of the vehicle by multiplying the electric current Ia for energizing the motor 24 by a coefficient depending on the steerability of the vehicle. If the front axle weight of the vehicle is greater than a standard front axle weight, then the coefficient should preferably be greater than 1, and if the front axle weight of the vehicle is smaller than a standard front axle weight, then the coefficient should preferably be smaller than 1. The process of multiplying the electric current Ia by the coefficient may be carried out as a correcting process at the time the electric current Ia is calculated in step S14.

As described above using the center ratio Rn shown in FIG. 15, the electric current Ia to energize the motor 24 is controlled so as to become smaller as the steering angle of the steering wheel 12 which corresponds to the returning rotational angle (returning angle) θsc approaches the neutral position. Thus, the assistive electric current Ia becomes substantially zero in the vicinity of the neutral position, so that the driver is prevented from being excessively assisted.

If the steering angle of the steering wheel 12 has reached the neutral position at the time the steering wheel 12 is returned, then the returning rotational angle θsc that has increased may be reset to subsequently assist the driver in turning the steering wheel 12 appropriately based on the base assistive characteristic curve 102 shown in FIG. 5.

[General comparison between the steering force applied by the driver in the embodiment and the first through third inventive examples, the steering force applied by the driver at the time the torque sensor 20 is normal, and the steering force applied by the driver at the time it is not assisted (the steering force applied by the driver at the time the driver manually steers the vehicle)]

Figure 16:
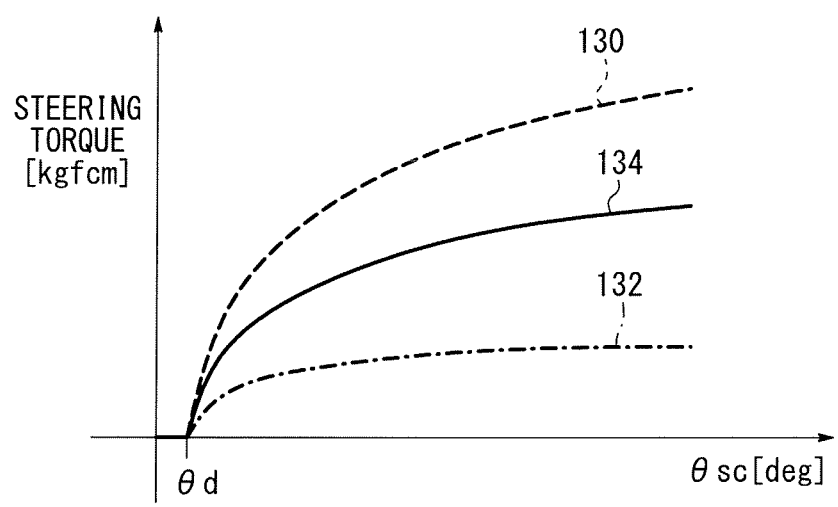
FIG. 16 is a diagram showing, for comparison, characteristics of a steering force which the driver needs to apply in a conventional assistive control process, a steering force which the driver needs to apply in an assistive control process according to the present invention, and a steering force which the driver needs to apply in the absence of any assistive control process.

When the driver turns the steering wheel 12 to steer the vehicle to make a right turn at an intersection at a vehicle speed Vs=about 30 [km/h], for example, if the torque sensor 20 of the electric power steering apparatus 10 operates normally (the normal-mode assistive process in step S21), then the steering force (steering torque) applied by the driver to turn the steering wheel 12 through the steering angle θs [deg] is represented by a dot-and-dash-line steering torque characteristic curve (steering force characteristic curve) 132 which is of a lowest level as shown in FIG. 16.

If the torque sensor 20 becomes abnormal and the tentative assistive control process is not carried out, i.e., the driver manually steers the vehicle, then as indicated by a broken-line steering torque characteristic curve 130 in FIG. 16, the driver needs to apply the steering force (steering torque) that is about 4 times (when the estimated steering angle θsc is of about 150 [deg]) as great as the steering force according to the steering torque characteristic curve 132 obtained when the torque sensor 20 operates normally.

On the other hand, according to the tentative assistive control process (also called a resolver assistive control process) using the resolver 58, etc. (or the steering angle sensor 19 if it is normal) in the embodiment and the first through third inventive examples, the steering force (steering torque) applied by the driver is about 2.5 times as great as the steering force according to the steering torque characteristic curve 132 obtained when the torque sensor 20 is normal, as indicated by a steering torque characteristic curve 134 in FIG. 16. Stated otherwise, the steering torque characteristic curve 134 according to the resolver assistive control process allows the assistive force to be reduced by about 30 [%] of that of the steering torque characteristic curve 130 for the manual steering process without the assistive control process, in most of the range of the estimated steering angle θsc that is greater than the dead-zone steering angle θd.

The present invention is not limited to the embodiment and the first through third inventive examples, but may adopt various arrangements based on the contents of the disclosure of the above description.

The invention claimed is:

1. An electric power steering apparatus comprising:
an operating member which is operated by a driver to steer a vehicle;
a torque detector for detecting a torque generated by a steering system of the vehicle;
a vehicle speed detector for detecting a vehicle speed of the vehicle;
a motor for applying an assistive torque to a rotational shaft of the steering system;
a rotational angle detector for detecting a rotational angle of the steering system; and
an electronic control unit which receives signals corresponding to outputs of the operating member and the detectors, and is programmed to control the motor, wherein
the electronic control unit includes a motor controller for normally controlling an electric current for energizing the motor based on the torque detected by the torque detector;
the electronic control unit includes an abnormality detector for detecting whether the torque detector becomes abnormal or not;
the electronic control unit includes a storage unit storing, as a characteristic, a relationship between the rotational angle detected by the rotational angle detector and the electric current for energizing the motor;
when the abnormality detector detects an abnormality of the torque detector the electronic control unit effects a different control to determine the assistive steering torque to be applied by the motor to the rotational shaft based on the rotational angle detected by the rotational angle detector, in the different control the motor controller energizes the motor based on the rotational angle detected by the rotational angle detector and the characteristic, and when the motor is energized under the different control, the motor controller starts a process of reducing an electric current for energizing the motor if the absolute value of rotational angular velocity calculated based on the rotational angle is equal to or smaller than a prescribed value, and interrupts the process of reducing the electric current for energizing the motor if the absolute value of the rotational angular velocity continues to be equal to or smaller than the prescribed value for a prescribed time.

2. The electric power steering apparatus according to claim 1, wherein after the motor controller has interrupted the process of reducing the electric current for energizing the motor, the motor controller resumes the process of reducing the electric current for energizing the motor if the absolute value of the rotational angle at the time the process of reducing the electric current is interrupted decreases by a prescribed angle or greater.

3. An electric power steering apparatus comprising:
an operating member which is operated by a driver to steer a vehicle;
a torque detector for detecting a torque generated by a steering system of the vehicle;

a vehicle speed detector for detecting a vehicle speed of the vehicle;

a motor for applying an assistive torque to a rotational shaft of the steering system;

a rotational angle detector for detecting a rotational angle of the steering system; and an electronic control unit which receives signals corresponding to outputs of the operating member and the detectors, and is programmed to control the motor, wherein the electronic control unit includes a motor controller for controlling an electric current for energizing the motor based on the torque detected by the torque detector;

the electronic control unit includes an abnormality detector for detecting whether the torque detector becomes abnormal or not;

the electronic control unit includes a storage unit storing, as a characteristic, a relationship between the rotational angle detected by the rotational angle detector and the electric current for energizing the motor;

when the abnormality detector detects an abnormality of the torque detector the electronic control unit effects a different control to determine the assistive steering torque to be applied by the motor to the rotational shaft based on the rotational angle detected by the rotational angle detector, in the different control the motor controller energizes the motor based on the rotational angle detected by the rotational angle detector and the characteristic, and when the motor is energized under the different control the motor controller reduces the electric current for energizing the motor as a rotational angular velocity calculated based on the rotational angle increases, and the motor controller corrects the rotational angular velocity calculated based on the rotational angle detected by the rotational angle detector so as to be smaller as the vehicle speed becomes smaller than a prescribed vehicle speed, and energizes the motor based on the corrected rotational angular velocity and the characteristic.

4. An electric power steering apparatus comprising:

an operating member which is operated by a driver to steer a vehicle;

a torque detector for detecting a torque generated by a steering system of the vehicle;

a vehicle speed detector for detecting a vehicle speed of the vehicle;

a motor for applying an assistive torque to a rotational shaft of the steering system;

a rotational angle detector for detecting a rotational angle of the steering system; and an electronic control unit which receives signals corresponding to outputs of the operating member and the detectors, and is programmed to control the motor, wherein the electronic control unit includes a motor controller for controlling an electric current for energizing the motor based on the torque detected by the torque detector;

the electronic control unit includes an abnormality detector for detecting whether the torque detector becomes abnormal or not;

the electronic control unit includes a storage unit storing, as a characteristic, a relationship between the rotational angle detected by the rotational angle detector and the electric current for energizing the motor;

when the abnormality detector detects an abnormality of the torque detector the electronic control unit effects a different control to determine the assistive steering torque to be applied by the motor to the rotational shaft based on the rotational angle detected by the rotational angle detector, in the different control the motor controller detects a returning rotational angle using, as a reference angle, the rotational angle detected by the rotational angle detector when a turning assistive electric current becomes nearly zero while a returning angle of the operating member remains at a time the operating member is being returned toward a neutral position thereof, and under the different control energizes the motor based on the returning rotational angle and the characteristic.

5. The electric power steering apparatus according to claim 4, wherein when the operating member is returned toward the neutral position thereof, the motor controller allows energization of the motor if the vehicle speed is equal to or lower than a prescribed vehicle speed.

6. The electric power steering apparatus according to claim 4, wherein the motor controller multiplies the electric current for energizing the motor at the time the operating member is returned toward the neutral position thereof by a prescribed coefficient depending on a steerability of the vehicle.

7. The electric power steering apparatus according to claim 4, wherein when the operating member is returned toward the neutral position thereof, the motor controller reduces the electric current for energizing the motor as the steering angle of the operating member approaches the neutral position.

8. The electric power steering apparatus according to claim 4, wherein when the operating member is returned toward the neutral position thereof, the electronic control unit resets the returning rotational angle if the steering angle of the operating member reaches the neutral position.

* * * * *